United States Patent
Oka et al.

(10) Patent No.: US 7,973,883 B2
(45) Date of Patent: Jul. 5, 2011

(54) POLARIZING PLATE PROTECTIVE FILM, POLARIZING PLATE, AND LIQUID CRYSTAL DISPLAY

(75) Inventors: Shigeki Oka, Tokyo (JP); Kunio Shimizu, Yamanashi (JP)

(73) Assignee: Konica Minolta Opto, Inc., Tokyo (JP)

( * ) Notice: Subject to any disclaimer, the term of this patent is extended or adjusted under 35 U.S.C. 154(b) by 270 days.

(21) Appl. No.: 12/296,297

(22) PCT Filed: Apr. 2, 2007

(86) PCT No.: PCT/JP2007/057386
§ 371 (c)(1),
(2), (4) Date: Oct. 7, 2008

(87) PCT Pub. No.: WO2007/119646
PCT Pub. Date: Oct. 25, 2007

(65) Prior Publication Data
US 2010/0157206 A1 Jun. 24, 2010

(30) Foreign Application Priority Data

Apr. 12, 2006 (JP) .................................. 2006-109477

(51) Int. Cl.
*G02F 1/1335* (2006.01)
*C09K 19/00* (2006.01)

(52) U.S. Cl. ........................................... 349/96; 428/1.1
(58) Field of Classification Search .................. None
See application file for complete search history.

(56) References Cited

U.S. PATENT DOCUMENTS

| 7,569,259 B2 * | 8/2009 | Okubo et al. ................ 428/1.33 |
| 2005/0112297 A1 * | 5/2005 | Shukla et al. .................. 428/1.1 |
| 2006/0204678 A1 * | 9/2006 | Hayashi et al. ................ 428/1.3 |

FOREIGN PATENT DOCUMENTS

| JP | 2005330415 | | 12/2005 |
| JP | 2005330415 A | * | 12/2005 |
| JP | 2006337664 | | 12/2006 |
| WO | 2006132105 | | 12/2006 |

* cited by examiner

*Primary Examiner* — Sarah Hahm
(74) *Attorney, Agent, or Firm* — Lucas & Mercanti, LLP

(57) ABSTRACT

Disclosed is a polarizing plate protective film having high dimensional stability against moisture. Also disclosed are a polarizing plate using such a polarizing plate protective film, and a liquid crystal display. Specifically disclosed is a polarizing plate protective film which is characterized by containing a cellulose ester and a polymer X which is obtained by copolymerizing at least a styrene derivative monomer Xa having no hydroxyl group and an ethylenically unsaturated monomer Xb having a hydroxyl group or a carboxyl group, and has a weight average molecular weight of 500-100,000.

5 Claims, No Drawings

POLARIZING PLATE PROTECTIVE FILM, POLARIZING PLATE, AND LIQUID CRYSTAL DISPLAY

This Application is a 371 of International Application PCT/2007/057386 filed on Apr. 2, 2007, which claims the priority of Japanese Patent Application No. 2006-109477 filed on Apr. 12, 2006, the priority of both Applications is claimed and the entire content of each of the Applications is hereby incorporated by reference.

TECHNICAL FIELD

The present invention relates to a polarizing plate protective film, a polarizing plate, and a liquid crystal display device, and, in particular, to a polarizing plate protective film exhibiting excellent humidity resistance properties, and a polarizing plate and a liquid crystal display device both of which employ the above polarizing plate protective film.

BACKGROUND ART

A retardation film, comprising a transparent optical film in which the birefringence thereof is controlled, has been utilized to increase the viewing angle of a liquid crystal display device. Most of the above retardation films have been produced employing materials exhibiting the highest refractive index in the orientation direction of molecules, the so-called positive optical anisotropy. Other than the retardation film, in a triacetate cellulose film (a TAC film), which is used as a polarizing plate protective film, the triacetate cellulose therein also exhibits a small but positive optical anisotropy. However, in case that phase difference is applied to the polarizing plate protective film itself, since materials exhibiting positive optical anisotropy, such as cellulose ester, cycloolefin, or polycarbonate, are stretched for the production of the polarizing plate protective film, the in-plane refractive index of the film is maximized. Therefore it was difficult to produce a retardation film having a low in-plane refractive index, a so-called positive C-plate. To produce the positive C-plate, there have been disclosed methods, one being to negate birefringence of the film by incorporating a material exhibiting negative optical anisotropy, and the other being to apply negative optical anisotropy to the entire film by increasing the additive amount of the above material these materials, polystyrene has been known as a material exhibiting significant negative birefringence (for example, refer to Patent Documents 1 and 2). However, since polystyrene is less likely to be compatible with materials such as a cellulose ester which were used for producing the polarizing plate protective film, the polystyrene exhibited a problem in that a large amount thereof could not be incorporated. The cellulose ester also exhibited a problem in that dimensions of the film tended to change due to water being absorbed and/or repelled by the film.

Patent Document 1: Japanese Patent Application Publication (hereinafter also referred to as JP-A) No. 2002-156624
Patent Document 2: JP-A No. 2005-105140

DISCLOSURE OF THE INVENTION

Problems to be Solved by the Invention

An object of the invention is to provide a polarizing plate protective film exhibiting a high dimensional stability against humidity, and a polarizing plate and a liquid crystal display device both of which employ the above polarizing plate protective film.

Means to Solve the Problems

The above issues of the present invention can be achieved by the following constitutions.

Item 1. A polarizing plate protective film, wherein the film incorporates a polymer X, exhibiting a weight-average molecular weight of 500 to 100,000, which was provided by a copolymerization of a styrene derivative monomer Xa having no hydroxyl group with an ethylenically unsaturated monomer Xb having a hydroxyl group or a carboxyl group, and a cellulose ester.

Item 2. The polarizing plate protective film of the aforesaid item 1, wherein Xb is at least a compound selected from the group consisting of a hydroxystyrene, a hydroxyacrylate, and a hydroxymethacrylate.

Item 3. A polarizing plate in which a polarizer is sandwiched by two polarizing plate protective films, wherein at least one of the polarizing plate protective films is the polarizing plate protective film of the above-described Item 1 or 2.

Item 4. A liquid crystal display device, wherein the polarizing plate protective film of the above-described Item 3 is used on at least one of surfaces of a liquid crystal cell.

Item 5. The liquid crystal display device of the above-described Item 4, wherein the above-described liquid crystal display device is an in-plane switching mode liquid crystal display device.

Effects of the Invention

According to the present invention, a polarizing plate protective film exhibiting a high dimensional stability against humidity, and a polarizing plate and a liquid crystal display device both of which employ the above polarizing plate protective film can be provided.

PREFERRED EMBODIMENTS TO CARRY OUT THE INVENTION

As a result of close examination, in view of the foregoing, the inventors of the present invention found that a polarizing plate protective film exhibiting a high dimensional stability against humidity was provided by a polarizing plate protective film incorporating a polymer X, exhibiting a weight-average molecular weight of 500 to 100,000, which was provided by a copolymerization of a styrene derivative monomer Xa having no hydroxyl group with an ethylenically unsaturated monomer Xb having a hydroxyl group or a carboxyl group, and a cellulose ester, to result in achievement of the present invention.

The present invention will be explained in detail.

[Polymer X]

It is known that, in general, a substance having an aromatic ring in the monomer, in particular, at the main chain, exhibits a positive birefringence like a birefringence of a cellulose ester, and the substance does not negate the retardation value Rth of the film. Therefore, it is preferable that a material exhibiting a negative birefringence is added to a polarizing plate protective film.

The polarizing plate protective film of the present invention is characterized in that the polarizing plate protective film incorporates a polymer X, exhibiting a weight-average molecular weight of 500 to 100,000, which was provided by a copolymerization of a styrene derivative monomer Xa having no hydroxyl group with an ethylenically unsaturated monomer Xb having a hydroxyl group or a carboxyl group, and a cellulose ester.

The polymer X of the present invention is a polymer, exhibiting a weight-average molecular weight of 500 to 100,000, which was provided by a copolymerization of a styrene derivative monomer Xa having no hydroxyl group with an ethylenically unsaturated monomer Xb having a hydroxyl group or a carboxyl group. The styrene derivative monomer Xa having no hydroxyl group includes a styrene monomer and derivatives thereof.

Introduction of the styrene derivative monomer Xa into the polymer X provides the polarizing plate protective film with a negative birefringence, and introduction of the ethylenically unsaturated monomer Xb having a hydroxyl group (a hydrophilic group) into the polymer X improves compatibility with a cellulose ester.

(Styrene Derivative Monomer Xa Having No Hydroxyl Group or Carboxyl Group)

The styrene derivative monomer Xa having no hydroxyl group or carboxyl group, which constitutes the polymer X, is a hydrophobic monomer having no hydroxyl group, and includes monomers such that 0 to 5 hydrogen atoms of an aromatic ring of the styrene are substituted by substituents other than hydroxyl group, such as an alkyl group such as a methyl group, an ethyl group, a propyl group, an isopropyl group, a butyl group, or a pentyl group; and an alkoxy group such as a methoxy group, an ethoxy group, an isopropoxy group, or a butoxy group.

Specific compounds include styrene, α-methyl styrene, o-methyl styrene, m-methyl styrene, p-methyl styrene, and vinyl naphthalene.

(Ethylenically Unsaturated Monomer Xb Having Hydroxyl Group or Carboxyl Group)

The ethylenically unsaturated monomer Xb having a hydroxyl group, which constitutes the polymer X, is a hydrophilic monomer having a hydroxyl group, and preferably is styrenes, acrylic acid esters, or methacrylic acid esters, and the specific examples include hydroxyl styrene, (2-hydroxy ethyl)acrylate, (2-hydroxy propyl)acrylate, (3-hydroxy propyl)acrylate, (2-hydroxy butyl)acrylate, (4-hydroxy butyl) acrylate, or compounds whose acrylate is substituted with methacrylate. The preferred compounds are (2-hydroxy ethyl)acrylate, (2-hydroxy ethyl)methacrylate, (2-hydroxy propyl)methacrylate, or (3-hydroxy propyl)acrylate. Of these, hydroxyl acrylate or hydroxyl methacrylate is preferable.

In the present invention, the polymer X is synthesized via copolymerization employing at least the above-described hydrophobic monomer Xa and the hydrophilic monomer Xb.

The molar ratio of the hydrophobic monomer Xa to the hydrophilic monomer Xb employed in the polymer X, that is Xa:Xb, is preferably in the range of 40:60 to 98:2. The high percentage of the hydrophobic monomer Xa improves the compatibility of the polymer X with cellulose ester, but increases a retardation value Rth in the direction of the film thickness. On the contrary, the high percentage of hydrophilic monomer Xb exhibits an excellent effect for decreasing the retardation value Rth, while deteriorating the above-described compatibility.

In the polymer X of the present invention, a monomer Xc, other than Xa or Xb, may be incorporated via copolymerization. The species of Xc may be at least one, and the content of Xc is preferably not more than 50 molar percent of the polymer X.

The content of the polymer X in the polarizing plate protective film is preferably 1 to 99 percent by mass, more preferably 2 to 98 percent by mass, and still further preferably 3 to 95 percent by mass.

To synthesize the polymer X described above, it is difficult for the conventional polymerization to control the molecular weight, and then it is preferable to employ a method which does not increase the molecular weight so high and produces polymers exhibiting a uniform molecular weight as much as possible. Such polymerization methods include a method using a peroxide polymerization initiator such as cumene peroxide or t-butylhydroperoxide; a method using a greater amount of polymerization initiator than the amount used for conventional polymerization; a method using a chain-transfer agent such as a mercapto compound and carbon tetrachloride in addition to the polymerization initiator; a method using a polymerization terminator such as benzoquinone and dinitrobenzene in addition to the polymerization initiator; and a bulk polymerization method employing a compound having one thiol group and secondary hydroxyl group, or a polymerization catalyst which is a combination of the aforesaid compound and an organic metallic compound, as disclosed in Patent Documents JP-A No. 2000-128911 or JP-A No. 2000-344823. Any of above methods may be preferably employed in the present invention.

The polymer X has a weight-average molecular weight of 500 to 100,000, more preferably 1,000 to 30,000.

It is preferable that higher molecular weight exhibits advantages such as less dimensional change of a cellulose ester film under conditions of high temperature and high relative humidity, and less curling as a polarizing plate protective film. When the weight-average molecular weight exceeds 100,000, the compatibility of the polymer X with cellulose ester degrades, resulting in generation of a breed-out under conditions of high temperature and high relative humidity, as well as a haze immediately after the film-forming.

The weight-average molecular weight of the polymer X of the present invention can be controlled via commonly known molecular weight controlling methods. Examples of such a molecular weight controlling method include a method in which a chain transfer agent such as carbon tetrachloride, laurylmercaptane, and octyl thioglycolate is added. The polymerization is usually carried out at temperature of from room temperature to 130° C., and preferably 50 to 100° C. The molecular weight can be controlled by adjusting the temperature or the polymerization reaction time.

A measuring method of a weight-average molecular weight is described below.

(Molecular Weight Measuring Method)

The weight-average molecular weight is determined employing a gel permeation chromatography (GPC).

Measuring conditions are indicated below.

Solvent: Methylene chloride

Column: Shodex K806, K805, K803G (Three columns manufactured by Showa Denko Co., Ltd. were employed in series.)

Column temperature: 25° C.

Sample concentration: 0.1% by mass

Detector: RI Model 504 (produced by GL Science Inc.)

Pump: L6000 (produced by Hitachi, Ltd.)

Feed rate: 1.0 ml/min.

Calibration: Standard Polystyrene STK (standard polystyrene: produced by Tosoh Corporation): Calibration curves based on 13 samples of Mw=1,000,000–500 are used. These 13 samples are used at an almost equally spaced interval.

The polymer X, which is preferably employed in the present invention, includes styrene/2-hydroxyethylacryrate, styrene/2-hydroxyethylmethacryrate, styrene/2-hydroxypropylmethacryrate, styrene/3-hydroxypropylacryrate, p-methylstyrene/2-hydroxyethylacryrate, and styrene/2-hydroxystyrene, but is not limited to them.

As the copolymer of styrene/2-hydroxyethylmethacryrate, a block copolymer is known, but a random copolymer thereof is preferable.

The copolymer of styrene/hydroxystyrene is commercially available from, for example, Maruzen Petrochemical Co., Ltd. as MARUKALYNCUR CST.

[Polycarboxylic Acid Esters]

It is preferable that the polarizing plate protective film of the present invention incorporates a polycarboxylic acid ester.

The polycarboxylic acid esters, which are useful for the present invention, are composed of an ester of an alcohol and polycarboxylic acid exhibiting a valence of two or more, preferably a valence of 2 to 20. In case of an aliphatic polycarboxylic acid, the valence is preferably 2 to 20, and in case of an aromatic polycarboxylic acid, or an alicyclic polycarboxylic acid, the valence is preferably 3 to 20.

The polycarboxylic acid employed in the present invention is represented by Formula (Y) below.

$$R_{12}(COOH)_m(OH)_n \qquad \text{Formula (Y):}$$

(wherein $R_{12}$ represents an organic group of a valence of m+n, m represents a positive integer of 2 or more, n represents an integer of 0 or more, COOH group represents a carboxyl group, and OH group represents an alcoholic or a phenolic hydroxyl group.)

Examples of the preferable polycarboxylic acid are listed below, but are not limited to them; aromatic polycarboxylic acids having a valence of 3 or more such as trimellitic acid, trimesic acid and pyromellitic acid, or derivatives thereof; aliphatic polycarboxylic acids such as succinic acid, adipic acid, azelaic acid, sebacic acid, oxalic acid, fumaric acid, maleic acid, and tetrahydrophthalic acid; and oxypolycarboxylic acids such as tartaric acid, tartronic acid, malic acid, and citric acid. Of these, it is preferable to use particularly the oxypolycarboxylic acids with respect to the improvement of retention ability.

The alcohol used for the polycarboxylic acid esters of the present invention is not specifically limited, and any known alcohol or phenol in the art is usable. For example, saturated or unsaturated aliphatic alcohol with a normal chain or a branched chain having a carbon number of 1 to 32 may be preferably used. The carbon number is more preferably 1 to 20, and still more preferably 1 to 10. Also, preferably usable are, for example, alicyclic alcohols such as cyclopentanol and cyclohexanol or derivatives thereof, and aromatic alcohols such as benzyl alcohol and cinnamyl alcohol or derivatives thereof.

When an oxypolycarboxylic acid is used as a polycarboxylic acid, the alcoholic or phenolic hydroxyl group of the oxypolycarboxylic acid may be esterified using a monocarboxylic acid. The followings can be listed as examples of a preferable monocarboxylic acid, but the present invention is not limited thereto.

Examples of a preferable aliphatic monocarboxylic acid include a fatty acid containing a normal chain or a branched chain having a carbon number of 1 to 32. The carbon number is more preferably 1 to 20, and still more preferably 1 to 10. Examples of a preferred aliphatic monocarboxylic acid include saturated fatty acids such as acetic acid, propionic acid, butyric acid, valeric acid, caproic acid, enanthic acid, caprylic acid, pelargonic acid, caprin acid, 2-ethylhexane carboxylic acid, undecylic acid, lauric acid, tridecyl acid, myristic acid, pentadecyl acid, palmitic acid, heptadecyl acid, stearic acid, nonadecanoic acid, arachic acid, behenic acid, lignoceric acid, cerotic acid, heptacosanoic acid, montanic acid, melissic acid and lacceric acid; and unsaturated fatty acids such as undecylenic acid, oleic acid, sorbic acid, linoleic acid, linolenic acid, and arachidonic acid.

Examples of a preferred alicyclic monocarboxylic acid include cyclopentane carboxylic acid, cyclohexane carboxylic acid, cyclooctane carboxylic acid, and derivatives thereof.

Examples of a preferred aromatic monocarboxylic acid include benzoic acid and compounds such as toluic acid in which an alkyl group is introduced into the benzene ring of benzoic acid; benzoic acid in which an alkoxy group such as a methoxy group, an ethoxy group, an isopropoxy group, and a buthoxy group is introduced into the benzene ring thereof; aromatic monocarboxylic acids having two or more benzene rings such as biphenyl carboxylic acid, naphthalene carboxylic acid and tetralin carboxylic acid; and derivatives thereof. Of these, acetic acid, propionic, acid, and benzoic acid are preferable.

The molecular weight of a polycarboxylic acid ester is not specifically limited, but preferably in the range of 300 to 1,000, and more preferably in the range of 350 to 750. Larger molecular weight is preferable with respect to improving retention ability, while smaller molecular weight is preferable with respect to moisture permeability and compatibility with a cellulose ester.

The alcohol used for the polycarboxylic acid ester may be one kind or in combination of two or more kinds.

The acid value of the polycarboxylic acid ester used in the present invention is preferably not more than 1 mgKOH/g, and more preferably not more than 0.2 mgKOH/g. By setting the acid value within the above range, a variation of a retardation value due to environmental factors is preferably suppressed.

Examples of particularly preferable polycarboxylic acid esters are listed below, but are not limited to them. Examples include triethyl citrate, tributyl citrate, acetyl triethyl citrate (ATEC), acetyl tributyl citrate (ATBC), benzoyl tributyl citrate, acetyl triphenyl citrate, acetyl tribenzyl citrate, dibutyl tartarate, diacetyl dibutyl tartarate, tributyl trimellitate, tetrabutyl pyromellitate, and citrate ester. Of these, citrate ester is preferred. Citrate ester provides cellulose ester film with flexibility, and enhances bending performance as well as plasticity thereof, to more readily enable the cellulose ester film to achieve biaxial drawing.

The content of the polymer X and the polycarboxylic acid ester in the cellulose ester film is preferably in the range which satisfies Formula (1) and Formula (2) below.

$$5 \leq Xg+Yg \leq 40 \ (\% \text{ by mass}) \qquad \text{Formula (1):}$$

$$0.05 \leq Yg/(Xg+Yg) \leq 0.5 \qquad \text{Formula (2):}$$

wherein the content of the polymer X is denoted by Xg (% by mass), and the content of the polycarboxylic acid ester is denoted by Yg (% by mass).

The preferable range of Formula (1) is 10 to 25% by mass.

When the total amount of the polymer X and the polycarboxylic acid ester is not less than 5% by mass, the sufficiently reduced retardation value Rth is obtainable. Further, when the total amount is not more than 40% by mass, the adhesiveness of the polarizer to PVA is excellent.

The amount of the polymer X is preferably in a range which satisfies the above-described Formula (2) in order to achieve the effects of the present invention with regard to dimensional change and retardation value Rth.

The polymer X and the polycarboxylic acid ester polymer may be directly added and dissolved into dope solution, which will be described later, as materials constituting the dope solution; or added into the dope solution after the polymer X and the polycarboxylic acid ester polymer are dissolved into an organic solvent which dissolves the cellulose ester.

(Other Polymers)

In the present invention, polymers other than the polymer X and the above-described polymers, and additives may be employed in combination with polymer X.

Such a polymer is preferably provided via polymerization of an ethylenically unsaturated monomer having no aromatic ring, exhibits a weight-average molecular weight Of 500 to 3,000, and is represented by Formula (Ym) below.

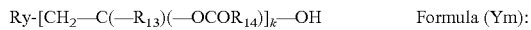
Formula (Ym):

(wherein Ry represents OH, H, or alkyl having a number of carbon atoms of up to and including 3, $R_{13}$ represents H or $CH_3$, $R_{14}$ represents $CH_2$, $C_2H_4$ or $C_3H_6$, and k represents a repeating unit.)

The ethylenically unsaturated monomer Ya, constituting a polymer Y which is provided via polymerization of an ethylenically unsaturated monomer having no aromatic ring, includes vinyl esters such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octoate, vinyl methacrylate, vinyl crotonate, vinyl sorbate, and vinyl cinnamate; acrylic acid esters such as methyl acrylate, ethyl acrylate, propyl acrylate (i-, n-), butyl acrylate (n-, s-, t-), pentyl acrylate (n-, s-), hexyl acrylate (n-, i-), heptyl acrylate (n-, i-), octyl acrylate (n-, i-), nonyl acrylate (n-, i-), myristyl acrylate (n-, i-), cyclohexyl acrylate, (2-ethylhexyl) acrylate, ε-caprolactone) acrylate, (2-hydroxy ethyl) acrylate, (2-hydroxy propyl) acrylate, (3-hydroxy propyl) acrylate, (4-hydroxy butyl) acrylate, (2-hydroxy butyl) acrylate; methacrylic acid esters such as these substances with the acrylate thereof being replaced by methacrylate; and unsaturated acids such as acrylic acid, methacrylic acid, maleic anhydride, crotonic acid and itaconic acid. The polymers constituted with the above monomers may be either a copolymer or a homopolymer, and a homopolymer of a vinyl ester, a copolymer of a vinyl ester, or a copolymer of a vinyl ester with an acrylic acid ester or a methacrylic acid ester are preferred.

Acrylic acid ester monomers having no aromatic ring include, for example, methyl acrylate, ethyl acrylate, propyl acrylate (i-, n-), butyl acrylate (n-, i-, s-, t-), pentyl acrylate (n-, s-), hexyl acrylate (n-, i-), heptyl acrylate (n-, i-), octyl acrylate (n-, nonyl acrylate (n-, i-), myristyl acrylate (n-, i-), (2-ethylhexyl) acrylate, (ε-caprolactone) acrylate, (2-hydroxy ethyl) acrylate, (2-hydroxy propyl) acrylate, (3-hydroxy propyl) acrylate, (4-hydroxy butyl) acrylate, (2-hydroxy butyl) acrylate, (2-methoxy ethyl) acrylate, and (2-ethoxy ethyl) acrylate, or these substances with the acrylate thereof being replaced by methacrylate.

Contents of the polymer Ym is preferably incorporated with 0 to 50% by mass of the polymer X, and more preferably 0 to 30% by mass.

Acrylic polymers are a homopolymer or a copolymer of the above-described monomers, but it is preferable that the acrylic polymers contain acrylic acid methyl ester monomer unit of not less than 30% by mass, and contain methacrylic acid methyl ester monomer unit of not less than 40% by mass. The homopolymer of methyl acrylate or methyl methacrylate is particularly preferable.

(Cellulose Ester)

The cellulose ester employed in the present invention is preferably a lower fatty acid ester of cellulose. The lower fatty acid in the lower fatty acid ester of cellulose denotes a fatty acid having not more than 6 carbon atoms. Examples include: cellulose acetate, cellulose propionate, cellulose butylate, and mixed fatty acid esters such as cellulose acetate propionate and cellulose acetate butyrate which are disclosed in JP-A No. 2002-309009, JP-A No. 10-45804, JP-A No. 8-231761 and U.S. Pat. No. 2,319,052. Of these described above, particularly preferably usable lower fatty acid ester of cellulose are cellulose triacetate, and cellulose acetate propionate. These cellulose esters may be used individually or in the form of mixtures.

Also preferably employed is a cellulose acylate having a total degree of acyl group substitution of 2- and 3-positions of a glucose unit of a cellulose ester of 1.70 to 1.95, and a degree of acyl group substitution of 6-position of 0.8 to 0.98. The degree of acyl group substitution of 2-, 3- and 6-positions of a cellulose acetate can be determined by the $^{13}$C-NMR measurement after a substitution treatment of the residual hydroxyl groups with other acyl groups (for example, a propionyl group), that is "a propionylation treatment". The determination method is described in detail in Tezuka et al. Carbohydr. Res. 273 (1995) 83-91. The degree of substitution of acetyl group and the like can be determined according to the method defined in ASTM-D817-96.

The degree of acyl group substitution of hydroxyl groups of cellulose is preferably not less than 2.85 and less than 3. The degree of acyl group substitution can be determined according to the stipulations of ASTM-D817-96.

Further, a cellulose ester, in which the degree of acyl group substitution of hydroxyl groups of cellulose satisfies the following Formulae (I)-(III), is also more preferably employed.

$$2.87 \leq SA+SP \leq 3 \qquad \text{Formula (I):}$$

$$0 \leq SA \leq 1.7 \qquad \text{Formula (II):}$$

$$1.3 \leq SP \leq 2.9 \qquad \text{Formula (III):}$$

(wherein SA and SP represent a degree of acyl group substitution of hydroxyl groups of a cellulose, and SA represents a degree of acetyl group substitution, and SP represents a degree of propionyl group substitution.)

Further, a cellulose ester which satisfies the Formulae (I)-(III) below is preferable.

$$2.89 \leq SA+SP \leq 2.99 \qquad \text{Formula (I):}$$

$$0 \leq SA \leq 1.6 \qquad \text{Formula (II):}$$

$$1.4 \leq SP \leq 2.85 \qquad \text{Formula (III):}$$

More preferably is a cellulose ester which satisfy Formulae (I)-(III) below.

$$2.90 \leq SA+SP \leq 2.98 \qquad \text{Formula (I):}$$

$$0 \leq SA \leq 1.5 \qquad \text{Formula (II):}$$

$$1.5 \leq SP \leq 2.8 \qquad \text{Formula (III):}$$

In cellulose acetate propionate or cellulose propionate which satisfy the above conditions, it is possible to achieve films exhibiting a negative Rth value and low haze, by employing cellulose acetate propionate or cellulose propionate exhibiting a total degree of substitution represented by the above Formula (I) of not less than 2.87. Further, by increasing the degree of propionyl substitution represented by above Formula (III), it becomes possible to lower the Rth value than that of cellulose acetate and decrease the humidity dependence of the Rth value. Further, in such a cellulose ester, since the amount of residual hydroxyl groups in the cellulose decreases, the release load from a band belt or a drum surface decreases and solubility to solvents increases, whereby well dissolved dope solution is obtained only by mixing at room temperature, and a film exhibiting an excellent surface state can be manufactured.

The basic principle regarding a method for synthesizing a cellulose ester is described in "Mokuzai Kagaku (Wood Chemistry)" by Nobuhiko Migita et al., pp. 180-190 (Kyoritsu Publishing, 1968). A representative method for synthesizing a cellulose ester is a liquid-phase acylation method employing carboxylic acid anhydride-carboxylic acid-sulfuric acid catalyst. Specifically, cellulose raw materials derived from wood pulp are pretreated with a suitable amount of a carboxylic acid such as acetic acid, followed by being introduced into a previously-cooled acylation mixture for esterification to synthesize a complete cellulose ester (that is, the total degree of acyl group substitution in the 2-, 3- and 6-positions is nearly 3.00). The above-described acylation mixture generally includes a carboxylic acid as a solvent, a carboxylic acid anhydride as an esterifying agent, and sulfuric acid as a catalyst. In general, the amount of the carboxylic acid anhydride is stoichiometrically excessively used over the total amount of water existing in the cellulose which reacts with the carboxylic acid anhydride and the system.

After the completion of the acylation, water or water-containing acetic acid is added to the system to hydrolyze the excessive carboxylic acid anhydride still remaining in the system. To partially neutralize the esterification catalyst, an aqueous solution of a neutralizing agent (for example, carbonate, acetate, hydroxide or oxide of calcium, magnesium, iron, aluminum or zinc) may be added. Then, the resulting complete cellulose acylate is stored at 20 to 90° C. in the presence of a small amount of an acylation catalyst (generally, sulfuric acid remaining in the system) to be saponified and ripened, thereby converting it into a cellulose ester having a targeted degree of acyl group substitution and a degree of polymerization. At a time when the targeted cellulose ester is obtained, the catalyst still remaining in the system is completely neutralized with the above-mentioned neutralizing agent, or without the catalyst being neutralized the cellulose ester solution is put into water or diluted acetic acid (alternatively, water or diluted acetic acid is put into the cellulose ester solution) to separate the cellulose ester, which is then subjected to washing and stabilization to produce the intended cellulose ester.

(An Example of Synthesis of Cellulose Acetate Propionate)

After a mixture of sulfuric acid as a catalyst (7.8 parts by mass relative to 100 parts of cellulose) and carboxylic acid anhydride were cooled down to −20° C., the resulting mixture was added into cellulose derived from hardwood pulp, followed by acylation at 40° C. During the processes, a kind of acyl group and a substitution ratio were controlled by controlling a kind and an amount of carboxylic acid anhydride. In addition, the total acyl group substitution was controlled by carrying out ripening at 40° C. after the acylation. The cellulose acetate propionate thus prepared exhibited a degree of acyl group substitution of 2.88 to 2.98, a degree of acetyl group substitution of 0.26 to 0.46, and a degree of propionyl group substitution of 2.52 to 2.69.

A part of the cellulose acetate propionate which is not substituted with an acyl group generally exists as a hydroxyl group. These can be synthesized by commonly known methods.

The cellulose ester which is synthesized using cotton linters, wood pulp or kenaf as raw materials may be used alone or in combination with one another. In particular, it is preferable to use a cellulose ester synthesized from cotton linters (hereafter merely referred to as linter) alone or in combination.

When the molecular weight of a cellulose ester is high, the rate of change of the modulus of elasticity by heat becomes small, but when the molecular weight is increased to be excessively high, the viscosity of dissolved solution of the cellulose ester becomes excessively high, resulting in decreased productivity. The number-average molecular weight (Mn) of the cellulose ester is preferably 30,000 to 200,000, and more preferably 40,000 to 170,000.

It is preferable that the cellulose ester exhibits pH of 6 to 7, and electric conductivity of 1 to 100 μS/cm, when 1 gram thereof is introduced into 20 ml of pure water (having electric conductivity of not more than 0.1 μS/cm, and pH of 6.8) and then stirred at 25° C. for one hour under nitrogen gas atmosphere. In a case where pH is less than 6, there is a concern that remaining organic acids may accelerate degradation of the cellulose during a melting process with application of heat, while in a case where pH is higher than 7, there is a concern that hydrolysis accelerates. Further, in a case where electric conductivity is not less than 100 μS/cm, a relatively large amount of remaining ion exists, and then it is assumed that the remaining ion can be a factor to degrade cellulose during a melting process with application of heat.

The β-1,4 bonded glucose unit constituting the cellulose has free hydroxide groups at the 2-, 3-, and 6-positions. The hydroxyl groups at the glucose unit constituting the cellulose of the cellulose ester employed in the present invention are substituted with acyl groups having not less than two carbon atoms. A cellulose ester which satisfies Formulae (A1) and (A2) below are preferably employed, when a degree of acyl group substitution of a hydroxyl group at each 2-, 3-, and 6-position of the glucose unit is denoted as DS2, DS3, and DS6, respectively.

$$2.8 \leq DS2+DS3+DS6 \leq 3.0 \quad \text{Formula (A1):}$$

$$DS6/(DS2+DS3+DS6) \geq 0.31 \quad \text{Formula (A2):}$$

The above DS6/(DS2+DS3+DS6) is preferably 0.31 to 0.35, and particularly preferably 0.315 to 0.340. It is possible to synthesize these cellulose esters via commonly known methods.

(Plasticizer)

It is preferable that a low molecular weight plasticizer, a low molecular weight UV absorber, or a low molecular weight antioxidant, all of which have been conventionally used, are substantially not incorporated in the dope used for film forming of the polarizing plate protective film of the present invention. If necessary, however, a little amount of low molecular weight plasticizer or low molecular weight antioxidant may be added to the extent of not causing separation.

Plasticizers listed below are usable in the polarizing plate protective film of the present invention.

Phosphate ester plasticizers: Specific examples of phosphate ester plasticizer include phosphoric acid alkyl esters such as triacetyl phosphate, and tributyl phosphate; phosphoric acid cycloalkyl esters such as tricyclopentyl phosphate, and cyclohexyl phosphate; and phosphoric acid aryl esters such as triphenyl phosphate, tricresyl phosphate, cresylphenyl phosphate, octydiphenyl phosphate, diphenylbiphenyl phosphate, trioctyl phosphate, tributyl phosphate, trinaphtyl phosphate, trixylyl phosphate, trisortho-biphenyl phosphate. The substituent groups for these may be the same or different, and may be further substituted. The substituent groups may be a mix of an alkyl group, a cycloalkyl group and an aryl group, and the substituent groups may be bonded to each other via covalent bond.

Examples of the phosphoric acid ester also include: alkylenebis(dialkylphosphate) such as ethylenebis(dimethylphosphate) and butylenebis(diethylphosphate); alkylenebis(diarylphosphate) such as ethylenebis(diphenylphosphate) and propylenebis(dinaphtylphosphate); arylenebis(dialkylphosphate) such as phenylenebis(dibutylphosphate) and biphenylenebis(dioctylphosphate); and arylenebis(diarylphosphates) such as phenylenebis(diphenylphosphate) and naphtylenebis(ditoluoylphosphate). These substituent groups may be the same or different, and may be further substituted. The substituent groups may be a mixture of an alkyl group, cycloalkyl groups and aryl groups, and the substituent groups may be bonded to each other via covalent bond.

Furthermore, a part of the structure of the phosphoric acid ester may be a part of the polymer or may be systematically included as a pendant. It may also be introduced into a part of the molecular structure of an additive such as an antioxidant, an acid scavenger, and an ultraviolet absorber. Of the compounds listed above, phosphoric acid aryl esters and arylenebis(diarylphosphate) are preferable, and more specifically, triphenyl phosphate and phenylenebis(diphenylphosphate) are preferable.

Ethylene glycol ester plasticizers: Specific examples of ethylene glycol phosphate ester plasticizer include: ethylene glycol alkyl ester plasticizers such as ethylene glycol diacetate and ethylene glycol dibutyrate; ethylene glycol cycloalkyl ester plasticizers such as ethylene glycol dicyclopropyl carboxylate and ethylene glycol dicyclohexyl carboxylate; and ethylene glycol aryl ester plasticizers such as ethylene glycol dibenzoate and ethylene glycol di-4-methyl benzoate. These alkylate groups, cycloalkylate groups and arylate groups may be the same or different, and may further be substituted. The above substituent groups may be a mixture of alkylate groups, cycloalkylate groups and arylate groups, and the substituent groups thereof may be bonded to each other via covalent bond. Further, the ethylene glycol portions may be substituted, and a partial structure of the ethylene glycol ester may be a part of the polymer or may be systematically included as a pendant. It may also be introduced into a part of the molecular structure of an additive such as an antioxidant, an acid scavenger, and an ultraviolet absorber.

Glycerin ester plasticizers: Specific examples of glycerin ester plasticizer include glycerin alky esters such as triacetin, tributylin, glycerin diacetate caprylate, and glycerin oleate propionate; glycerin cycloalkyl esters such as glycerin tricyclopropyl carboxylate, and glycerin tricyclohexyl carboxylate; glycerin aryl esters such as glycerin tribenzoate, and glycerin 4-methylbenzoate; diglycerin alkyl esters such as diglycerin tetraacetylate, diglycerin tetrapropionate, digylcerin acetate tri caprylate, and diglycerin tetralaurate, diglycerin cycloalkyl esters such as diglycerin tetracylobutyl carboxylate, and diglycerin tetracylopentyl carboxylate; and diglycerin aryl esters such as diglycerin tetrabenzoate, and diglycerin 3-methyl benzoate. These alkylate groups, cycloalkyl carboxylate groups and arylate groups may be the same or different, and may further be substituted. The above substituent groups may be a mixture of alkylate groups, cycloalkyl carboxylate groups and arylate groups, and the substituent groups thereof may be bonded to each other via covalent bond. Further, the glycerin and diglycerin portions may be substituted and a partial structure of the glycerin ester or diglycerin ester may be a part of the polymer or may be systematically included as a pendant. It may also be introduced into a part of the molecular structure of an additive such as an antioxidant, an acid scavenger, and an ultraviolet absorber.

Polyalcohol ester plasticizers: Specific examples of polyalcohol ester plasticizer include the polyalcohol ester plasticizers disclosed in JP-A 2003-12823, paragraphs 30-33.

These alkylate groups, cycloalkyl carboxylate groups, and arylate groups may be the same or different, and may be further be substituted. The above substituent groups may be a mixture of alkylate groups, cycloalkyl carboxylate groups and arylate groups, and the substituent groups thereof may be bonded to each other via covalent bond. Furthermore, the polyalcohol portion may be substituted and a partial structure of the polyalcohol may be a part of the polymer or may be systematically included as a pendant. It may also be introduced into a part of the molecular structure of an additive such as an antioxidant, an acid scavenger or an ultraviolet absorber.

Dicarboxylic acid ester plasticizers: Specific examples of dicarboxylic acid ester plasticizer include: alkyl dicarboxylic acid cycloalkyl ester plasticizers such as didodecyl malonate (C1), dioctyl adipate (C4), and dibutyl cebacate (C8); alkyl dicarboxylic acid cycloalkyl ester plasticizers such as dicyclopentyl succinate, and dicyclohexyl adipate; alkyl dicarboxylic acid aryl ester plasticizers such as diphenyl succinate, and di-4-methyl phenyl glutarate; cycloalkyl dicarboxylic acid alkyl ester plasticizers such as dihexyl-1,4-cyclohexane dicarboxylate, and didecyl bicyclo[2.2.1]heptane-2,3-dicarboxylate; cycloalkyl dicarboxylic acid cycloalkyl ester plasticizers such as dicyclohexyl-1,2-cyclobutane dicarboxylate, and dicyclopropyl-1,2-cyclohexyl dicarboxylate; cycloalkyl dicarboxylic acid aryl ester plasticizers such as diphenyl-1, 1-cyclopropyl dicarboxylate, and di-2-naphthyl-1,4-cyclohexane dicarboxylate; aryl dicarboxylic acid alkyl ester plasticizers such as diethyl phthalate, dimethyl phthalate, dioctyl phthalate, dibutyl phthalate, and di-2-ethylhexyl phthalate; aryl dicarboxylic acid cycloalkyl ester plasticizers such as dicyclopropyl phthalate, and dicyclohexyl phthalate; and aryl dicarboxylic acid aryl ester plasticizers such as diphenyl phthalate, and di-4-methylphenyl phthalate. These alkoxy groups and cycloalkoxy groups may be the same or different, and may also be monosubstituted, and the substitution groups may be further substituted. The above substituent groups may be a mixture of the alkyl groups and the cycloalkyl groups, and the substituent groups may be bonded to each other via covalent bond. Furthermore, the aromatic ring of the phthalic acid may be substituted, and may be a multimer such as a dimer, a trimer and a tetramer. And a partial structure of the phthalic acid ester may be a part of the polymer or may be systematically included as a pendant. It may also be introduced into a part of the molecular structure of an additive such as an antioxidant, an acid scavenger and an ultraviolet absorber.

(UV Absorber)

The polarizing plate protective film or other films used for a liquid crystal display contain a UV absorber, which functions to prevent deterioration of the liquid crystal or the polarizer when they are used outdoors. The UV absorber is preferably used also in the polarizing plate protective film of the present invention. It is preferable that the UV absorber exhibits an excellent characteristic of absorbing UV of not more than 370 nm in wavelength, absorbs visible light of not less than 400 nm in wavelength as little as possible, and exhibits optical transmittance of not less than 50%. In particular, the optical transmittance at 370 nm in wavelength is preferably not more than 10%, and more preferably not more than 5%. Examples of the UV absorber usable in the present invention include: oxybenzophenone type compounds, benzotriazole type compounds, salicylate ester type compounds, benzophenone type compounds, cyanoacrylate type compounds, and nickel complex salts. Of these, preferred are benzotriazole type compounds, which exhibit little coloring property. Preferred are a benzotriazole type UV absorber and a benzophenone type UV absorber, which exhibit stability against light, and particularly preferred is a benzotriazole type UV absorber, which exhibits less unnecessary coloring property. Examples of preferably usable UV absorber include: TINUVIN 109 (hereinafter referred to as UV-1), TINUVIN 171, TINUVIN 326, TINUVIN 327, and TINUVIN 328 produced by Ciba Specialty Chemicals Inc. Since a low molecular weight UV absorber, like a plasticizer, tends to precipitate on the web or evaporate during a film making process depending on the amount to be employed, the amount to be added is preferably 1 to 10% by weight.

In the present invention, a polymer UV absorber, which is more difficult to be precipitated out than the above mentioned low molecular weight UV absorber, is preferably incorporated in the cellulose ester film together with the polymer of the present invention, whereby the polymer UV absorber thoroughly blocks UV rays without degrading desired properties such as dimensional stability, retention ability, and moisture permeability, and further blocks the aforesaid rays in a stable state of not causing phase separation in the film. As a polymer UV absorber usable in the present invention, the polymer UV absorbers disclosed in JP-A No. 6-148430, and polymers containing a UV absorbing monomer can be used without limitation.

In particular, in the present invention, a UV absorbing copolymer (also referred to as a polymer UV absorber or a polymer UV agent) synthesized from a UV absorbing monomer represented by Formula (1) below is preferably incorporated in the cellulose ester film.

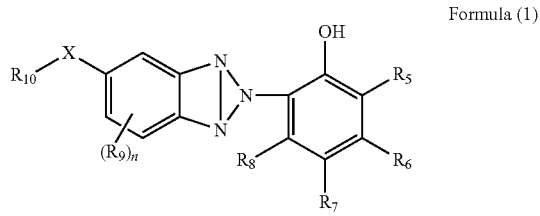

Formula (1)

(wherein n represents an integer of 0 to 3, each of $R_5$ to $R_9$ represents a hydrogen atom, a halogen atom or a substituent, X represents —COO—, —CONR$_{11}$—, —OCO—, or —NR$_{11}$CO—, and each of $R_{10}$ and $R_{11}$ represents a hydrogen atom, an alkyl group or an aryl group, provided that the group represented by $R_{10}$ contains a polymerizable group as a part of the structure.)

In Formula (1), n represents an integer of 0 to 3, and when n is 2 or more, a plurality of $R_9$ may be the same or different to each other and may be combined to form a 5 to 7-membered ring.

Each of $R_5$ to $R_9$ represents a hydrogen atom, a halogen atom or a substituent. Examples of a halogen atom include a fluorine atom, a chlorine atom, a bromine atom, and an iodine atom. Of these, preferable is a fluorine atom or a chlorine atom. Examples of a substituent include alkyl groups (for example, a methyl group, an ethyl group, an isopropyl group, a hydroxyethyl group, a methoxymethyl group, a trifluoromethyl group, and a t-butyl group); alkenyl groups (for example, a vinyl group, an allyl group, and a 3-butene-1-yl group); aryl groups (for example, a phenyl group, a naphthyl group, a p-tolyl group, and a p-chlorophenyl group); heterocycle groups (for example, a pyridyl group, a benzimidazolyl group, a benzothiazolyl group, and a benzoxazolyl group); alkoxy groups (for example, a methoxy group, an ethoxy group, an isopropoxy group, and a n-butoxy group); aryloxy groups (for example, a phenoxy group); heterocycleoxy groups (for example, a 1-phenyltetrazole-5-oxy group, and a 2-tetrahydropyranyloxy group); acyloxy groups (for example, an acetoxy group, a pivaloyloxy group, and a benzoyloxy group); acyl groups (for example, an acetyl group, a propanoyl group, and a butyroyl group); alkoxycarbonyl groups (for example, a methoxycarbonyl group, and an ethoxycarbonyl group); aryloxycarbonyl groups (for example, a phenoxycarbonyl group); carbamoyl groups (for example, a methylcarbamoyl group, an ethylcarbamoyl group, and a dimethylcarbamoyl group); amino groups, alkylamino groups (for example, a methylamino group, an ethylamino group, and a diethylamino group); anilino groups (for example, an anilino group, and a N-methylanilino group); acylamino groups (for example, an acetylamino group, and a propionylamino group); hydroxyl groups, cyano groups, nitro groups, sulfonamide groups (for example, a methanesulfonamide group, and a benzenesulfonamide group); sulfamoylamino groups (for example, a dimethylsulfamoylamino group); sulfonyl groups (for example, a methanesulfonyl group, a butanesulfonyl group, and a phenylsulfonyl group); sulfamoyl groups (for example, an ethylsulfamoyl group, and a dimethylsulfamoyl group); sulfonylamino groups (for example, a methanesulfonylamino group, and a benzenesulfonylamino group); ureido groups (for example, a 3-methylureido group, a 3,3-dimethylureido group, and a 1,3-dimethylureido group); imide groups (for example, a phthalimide group); silyl groups (for example, a trimethylsilyl group, a triethylsilyl group, and a t-butyldimethylsilyl group); alkylthio groups (for example, a methylthio group, an ethylthio group, and an n-butylthio group); and arylthio groups (for example, a phenylthio group). Of these, preferable are alkyl groups and aryl groups.

In Formula (2), each group represented by $R_5$ to $R_9$ may be further substituted in case where the above group can be further substituted. And neighboring groups of $R_5$ to $R_8$ may be combined to form a 5 to 7-membered ring.

$R_{10}$ represents a hydrogen atom, an alkyl group, a cycloalkyl group, an alkenyl group or an alkynyl group. Examples of an alkyl group include a methyl group, an ethyl group, a propyl group, an isopropyl group, an n-butyl group, an isobutyl group, a t-butyl group, an amyl group, an isoamyl group, and a hexyl group. The above alkyl groups may further have a halogen atom or a substituent. Examples of a halogen atom include a fluorine atom, a chlorine atom, a bromine atom, and an iodine atom. Examples of a substituent include acyl groups (for example, an acetyl group, a propanoyl group, and a butyroyl group); alkoxy groups (for example, a methoxy group, an ethoxy group, an isopropoxy group, and a n-butoxy group); amino groups; alkylamino groups (for example, a methylamino group, an ethylamino group, and a diethylamino group); acylamino groups (for example, an acetylamino group, and a propionylamino group); hydroxyl groups; cyano groups; carbamoyl groups (for example, a methylcarbamoyl group, an ethylcarbamoyl group, and a dimethylcarbamoyl group); acyloxy groups (for example, an acetoxy group, and a pivaloyloxy group); and alkoxycarbonyl groups (for example, a methoxycarbonyl group, and an ethoxycarbonyl group).

Examples of a cycloalkyl group include saturated cyclohydrocarbon groups such as a cyclopentyl group, a cyclohexyl group, a norbornyl group, and an adamantyl group, which may be further substituted or may not be substituted.

Examples of an alkenyl group include a vinyl group, an allyl group, a 1-methyl-2-propenyl group, a 3-butenyl group, a 3-methyl-2 butenyl group, and an oleyl group. Of these, preferable are a vinyl group or a 1-methyl-2-propenyl group.

Examples of an alkynyl group include an ethynyl group, a butadiyl group, a propargyl group, a 1-methyl-2-propynyl group, a 2-butyny group, a 1,1-dimethyl-2-propynyl group. Of these, preferable are an ethynyl group and a propargyl group.

In Formula (2), X represents —COO—, —CONR$_{11}$—, —OCO— or —NR$_{11}$CO—.

R$_{11}$ represents a hydrogen atom, an alkyl group and a cycloalkyl group. Examples of an alkyl group include a methyl group, an ethyl group, a propyl group, an isopropyl group, an n-butyl group, an isobutyl group, a t-butyl group, an amyl group, an isoamyl group, and a hexyl group. Each of these alkyl groups may further have a halogen atom or a substituent. Examples of a halogen atom include a fluorine atom, a chlorine atom, a bromine atom, and an iodine atom. Examples of a substituent include acyl groups (for example, an acetyl group, a propanoyl group, and a butyroyl group); alkoxy groups (for example, a methoxy group, an ethoxy group, an isopropoxy group, and a n-butoxy group); amino groups; alkylamino groups (for example, a methylamino group, an ethylamino group, and a diethylamino group); aniline groups (for example, an anilino group, and an N-methyl aniline group); acylamino groups (for example, an acetylamino group, and a propionylamino group); hydroxyl groups; cyano groups; carbamoyl groups (for example, a methylcarbamoyl group, an ethylcarbamoyl group, and a dimethylcarbamoyl group); acyloxy groups (for example, an acetoxy group, and a pivaloyloxy group); and alkoxycarbonyl groups (for example, a methoxycarbonyl group, and an ethoxycarbonyl group).

Examples of a cycloalkyl group include saturated cyclic hydrocarbons such as a cyclopentyl group, a cyclohexyl group, a norbornyl group, and an adamantyl group, which may be further substituted or may not be substituted.

In the present invention, "the polymerizable group" denotes an unsaturated ethylenic polymerizable group or a bifunctional condensation-polymerizable group, and preferably an unsaturated ethylenic polymerizable group. Specific examples of the unsaturated ethylenic polymerizable group include a vinyl group, an allyl group, an acryloyl group, a methacryloyl group, a styryl group, an acrylamido group, a methacrylamido group, a vinyl cyanide group, a 2-cyanoacryloxy group, a 1,2-epoxy group, and a vinyl ether group. Of these, preferable are a vinyl group, an acryloyl group, a methacryloyl group, an acrylamido group, and a methacrylamido group. "Having a polymerizable group as a part of structure" means that the above polymerizable group is bonded directly or through a linking group of divalent or more. Examples of a linking group of divalent or more include alkylene groups (such as a methylene group, a 1,2-ethylene group, a 1,3-propylene group, a 1,4-butylene group, and a cyclohexane-1,4-diyl group); alkenylene groups (such as an ethene-1,2-diyl group, and a butadiene-1,4-diyl group); alkynylene groups (such as an ethyne-1,2-diyl group, a butane-1,3-diin-1,4-diyl); and hetero atom linking groups (an oxygen atom, a sulfur atom, a nitrogen atom, a silicon atom, and a phosphor atom). Of these, preferable are an alkylene group, and a hetero atom linking group. These groups may further be combined to form a composite bonding group. The weight average molecular weight of the polymer derived from the UV absorbing monomer is preferably 2,000 to 30,000, and more preferably 5,000 to 20,000.

The weight average molecular weight of the UV absorbing copolymer can be controlled by commonly known molecular weight controlling methods. Molecular weight controlling methods include, for example, a method in which a chain transfer agent such as carbon tetrachloride, laurylmercptane or octyl thioglycolate is added. The polymerization is usually performed at a temperature in the range of room temperature to 130° C., and preferably 50 to 100° C.

The UV absorbing copolymer employed in the present invention may be a homopolymer derived from a CV absorbing monomer alone, or may be a copolymer derived from the UV absorbing monomer and another polymerizable monomer. Examples of the other polymerizable monomer capable of copolymerizing include unsaturated compounds such as styrene derivatives (for example, styrene, α-methylstyrene, o-methylstyrene, m-methylstyrene, p-methylstyrene, and vinylnephthalene); acrylic acid ester derivatives (for example, methyl acrylate, ethyl acrylate, propyl acrylate, butyl acrylate, acrylate, t-butyl acrylate, octyl acrylate, and cyclohexyl acrylate); methacrylic acid ester derivatives (for example, methyl methacrylate, ethyl methacrylate, propyl methacrylate, butyl methacrylate, i-butyl methacrylate, t-butyl methacrylate, octyl methacrylate, and cyclohexyl methacrylate); alkyl vinyl ethers (for example, methyl vinyl ether, ethyl vinyl ether, and butyl vinyl ether); alkyl vinyl esters (for example, vinyl formate, vinyl acetate, vinyl butyrate, vinyl capronate, and vinyl stearate); crotonic acid; maleic acid; fumaric acid; itaconic acid; acrylonitrile; methacrylonitrile; vinyl chloride; vinylidene chloride; acrylamide; and methacrylamide. Of these, methyl acrylate, methyl methacrylate, and vinyl acetate are preferred.

It is also preferable that the copolymer component other than the UV absorbing monomer in the polymer derived from the UV absorbing monomer contains at least one kind of a hydrophilic ethylenically unsaturated monomer.

As the hydrophilic ethylenically unsaturated monomer, a hydrophilic compound having a polymerizable unsaturated double bond in the molecular thereof is employable without any limitation. Examples are a unsaturated carboxylic acid such as acrylic acid and methacrylic acid; an acrylate and methacrylate each having a hydroxyl group or an ether bond (for example, 2-hydroxyethyl methaceylate, 2-hydroxypropyl methacrylate, tetrahydrfurfuryl methacrylate, 2-hydroxyethyl acrylate, 2-ydroxypropyl acrylate, 2,3-dihydroxy-2-methylpropyl methacrylate, tetrahydrofurfuryl acrylate, 2-ethoxyethyl acrylate, diethylene glycol ethoxylate acrylate, and 3-methoxybutylbutyl acrylate); acrylamide; an (N-substituted) (metha)acrylamido such as N,N-dimethyl(metha)acrylate; N-vinylpyrrolidone; and N-vinyloxazolidone.

As the hydrophilic ethylenically unsaturated monomer, a (metha)acrylate having a hydroxyl group or a carboxyl group in the molecule thereof is preferable, and 2-hydroxyethyl methacrylate, 2-hydroxypropyl methacrylate, 2-hydroxyethyl acrylate, and 2-hydroxypropyl acrylate are particularly preferable.

These polymerizable monomers can be copolymerized solely or in combination of two or more kinds together with the UV absorbing monomer.

The method for polymerizing the UV absorbing copolymer employed in the present invention is not specifically limited and commonly known methods such as radical polymerization, anion polymerization, and cation polymerization can be widely adopted. The initiators for the radical polymerization include, for example, azo compounds and peroxide compounds, and specific examples are azobisisobutyronitrile azobisisobutylic acid diester derivatives, benzoyl peroxide, and hydrogen peroxide. Examples of the solvent for the polymerization include, but is not specifically limited, aromatic hydrocarbon type solvents such as toluene and chlorobenzene; halogenized hydrocarbon type solvents such as dichloroethane and chloroform; ether type solvents such as tetrahydrofuran and dioxane; amide type solvents such as dimethylformamide; alcohol type solvents such as methanol; ester type solvents such as methyl acetate and ethyl acetate; ketone type solvents such as acetone, cyclohexanone, and methyl ethyl ketone; and an aqueous solvent. Depending on the selection of the solvent, various polymerization can be performed such as solution polymerization which is carried out in a uniform system, precipitation polymerization in which the formed polymer is precipitated, emulsion polymerization which is carried out in a micelle state, and suspension polymerization which is carried out in a suspended state. However, UV absorbing latex obtained via emulsion polymerization is not suitable for the optical film use.

The mixing ratio of the above-described UV absorbing monomer, the polymerizable monomer capable of polymerizing with the UV absorbing monomer, and the hydrophilic ethylenically unsaturated monomer is suitably selected considering the influence on compatibility of the obtained UV absorbing copolymer with the other transparent polymer, and the transparency and the mechanical strength of the optical film.

The content of the UV absorbing monomer in the UV absorbing polymer of the present invention which is derived from the UV absorbing monomer is preferably 1 to 70% by mass, and more preferably 5 to 60% by mass.

The hydrophilic ethylenically unsaturated monomer is preferably contained in the UV absorbing copolymer in an amount of from 0.1 to 50% by mass from a view of compatibility. The content of the hydrophilic ethylenically unsaturated monomer is more preferably from 0.5 to 20% by mass. In a case where the UV absorbing monomer itself is substituted with a hydrophilic group, it is preferable that the total content of the hydrophilic UV absorbing monomer and the hydrophilic ethylenically unsaturated monomer is within the above-mentioned range.

In order to achieve the preferable content of the UV absorbing monomer and the hydrophilic monomer, it is preferable that an ethylenically unsaturated monomer having no hydrophilic group is further copolymerized additionally to the above two monomers.

The UV absorbing monomer and the copolymerizable ethylenically unsaturated monomer may be copolymerized in a mixture of at least 2 of each monomer.

The representative examples of the UV absorbing monomer, which is preferably employed in the present invention, are listed below, but are not limited thereto.

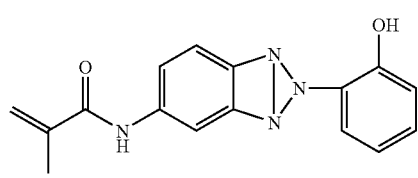

MUV-1

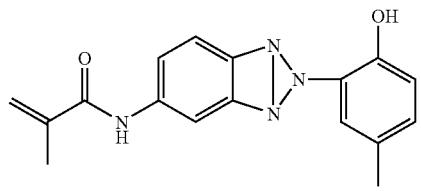

MUV-2

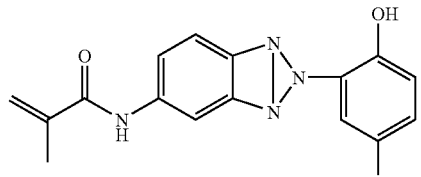

MUV-3

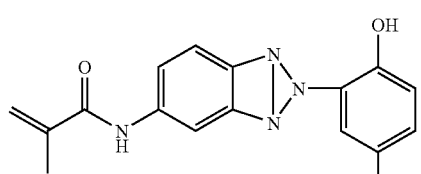

MUV-4

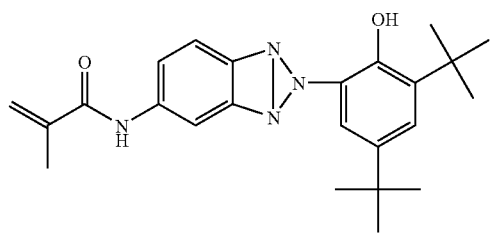

MUV-5

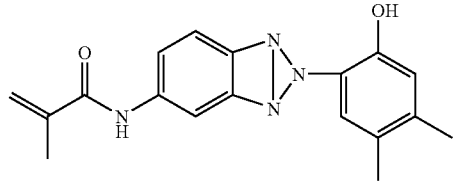

MUV-6

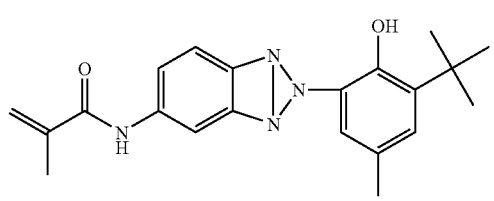

MUV-7

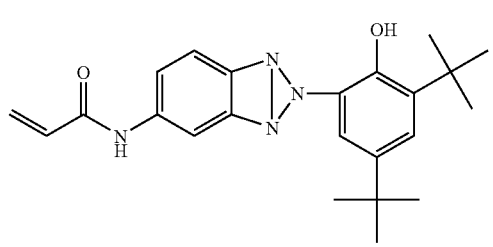

MUV-8

MUV-9
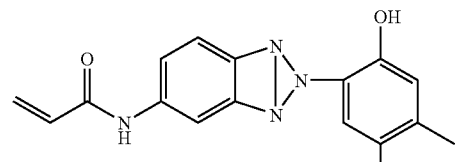
MUV-10
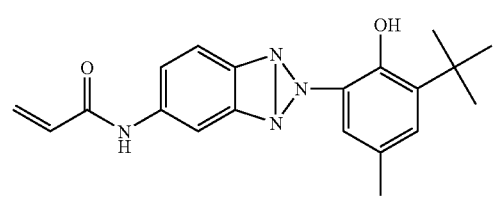
MUV-11
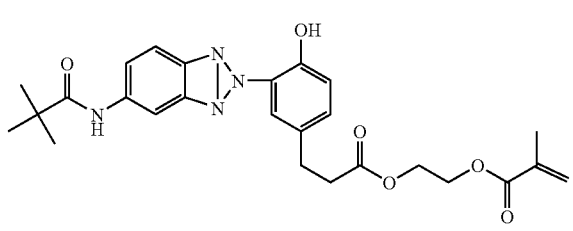
MUV-12
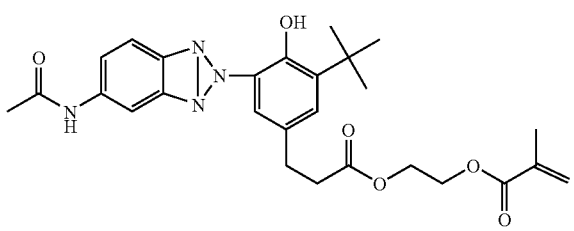
MUV-13
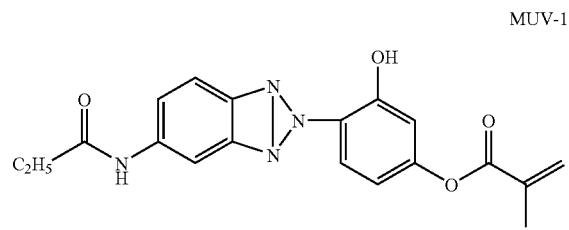
MUV-14
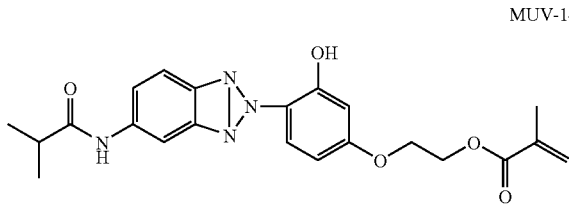
MUV-15
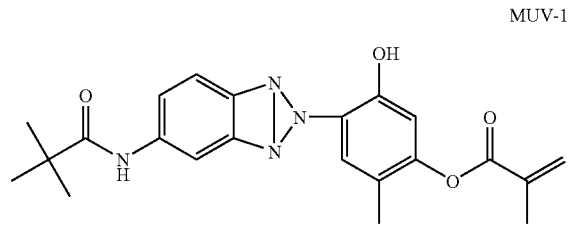
MUV-16
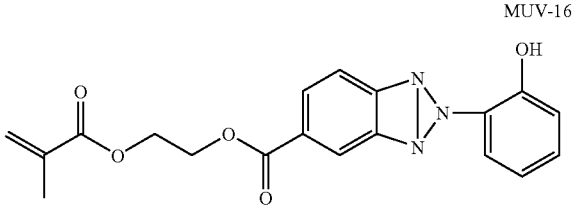
MUV-17
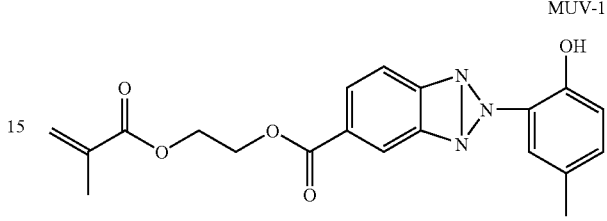
MUV-18
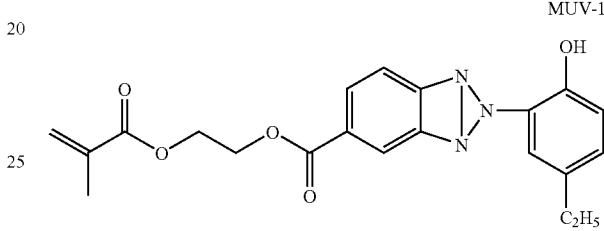
MUV-19
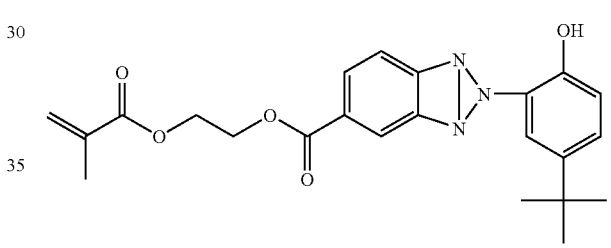
MUV-20
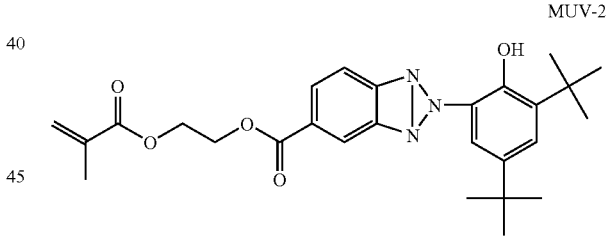
MUV-21
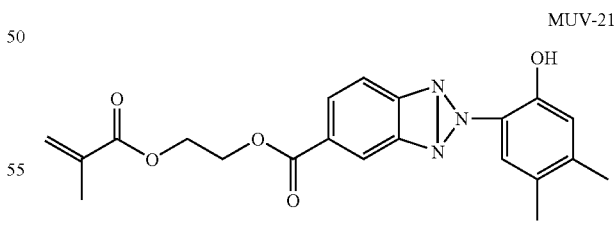
MUV-22
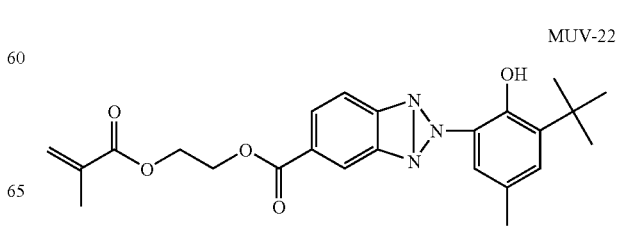

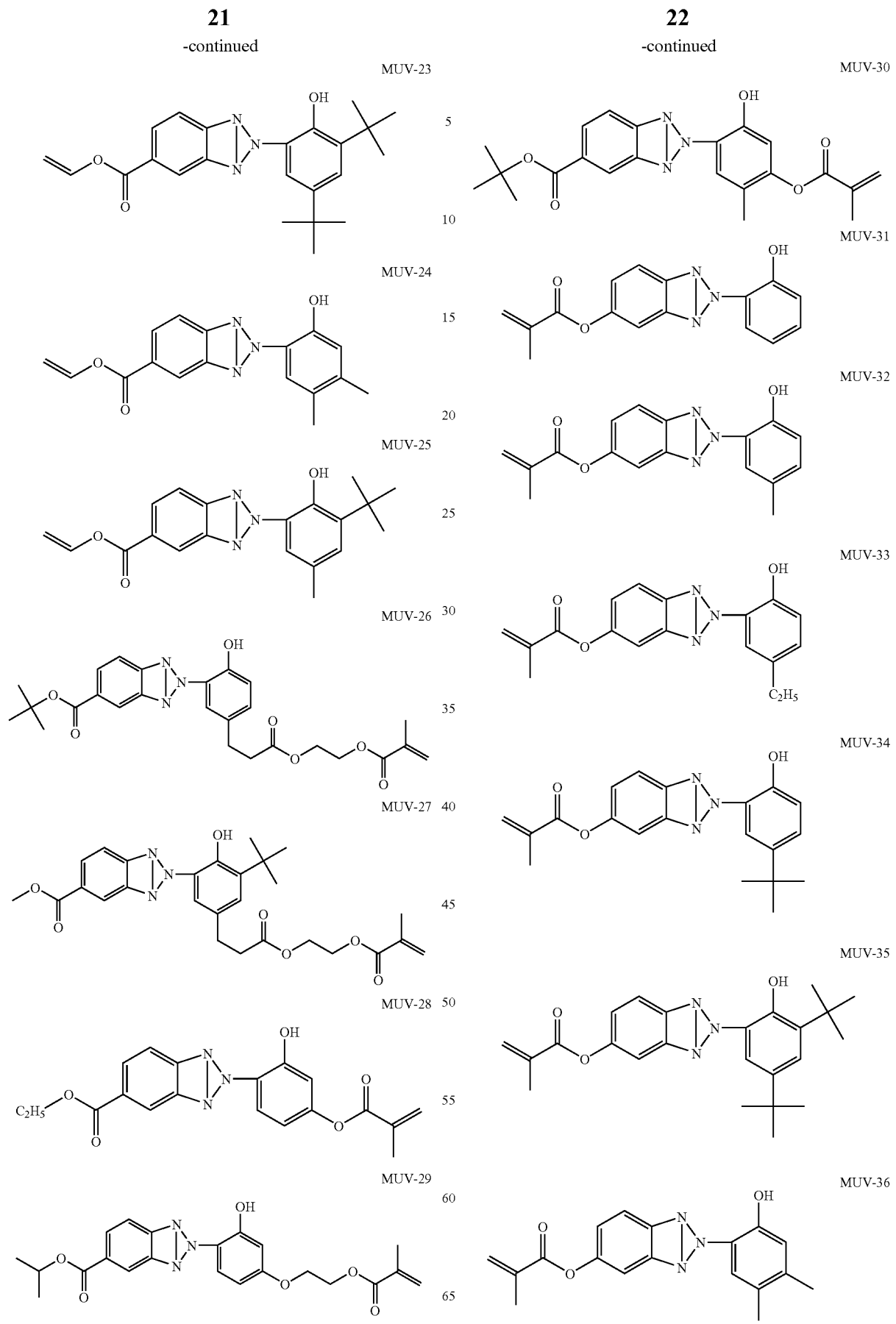

MUV-37
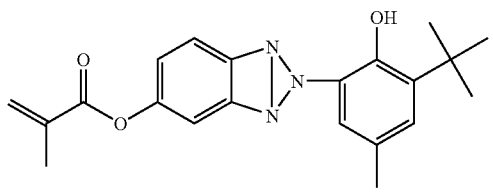
MUV-38
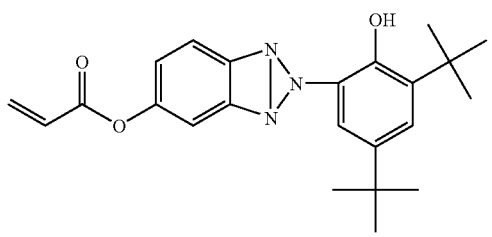
MUV-39
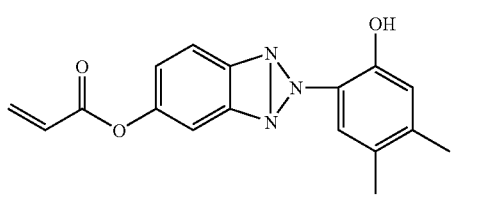
MUV-40
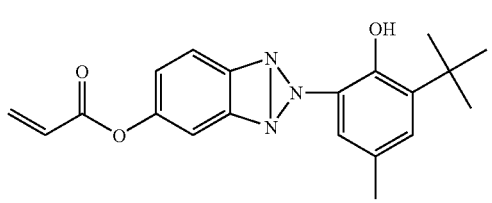
MUV-41
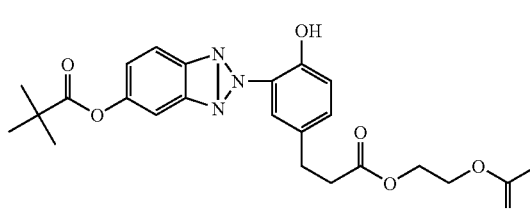
MUV-42
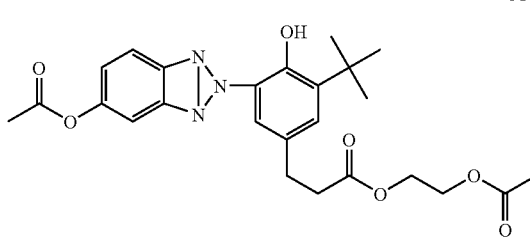
MUV-43
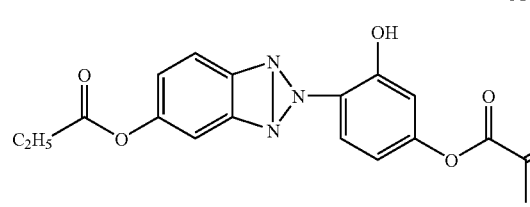
MUV-44
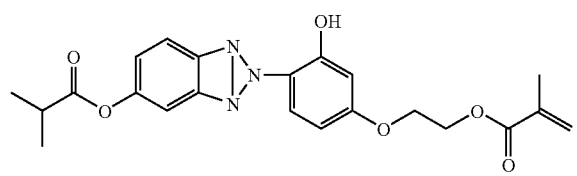
MUV-45
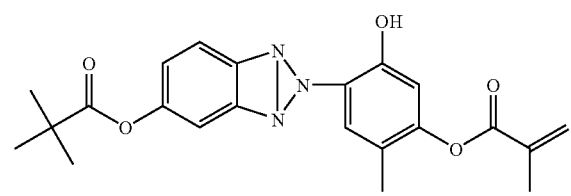
MUV-46
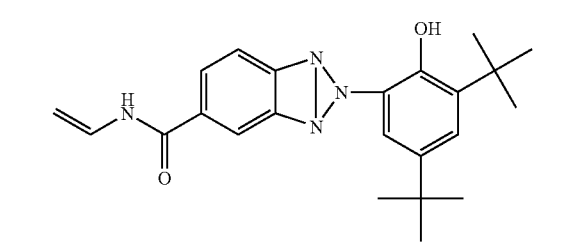
MUV-47
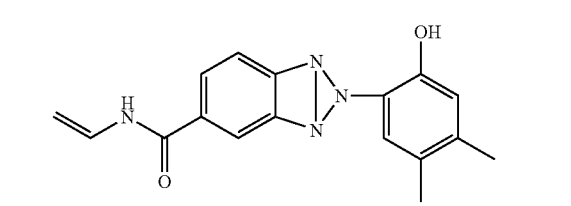
MUV-48
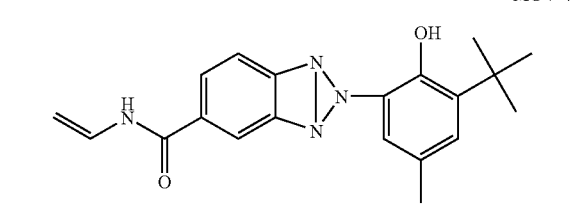
MUV-49
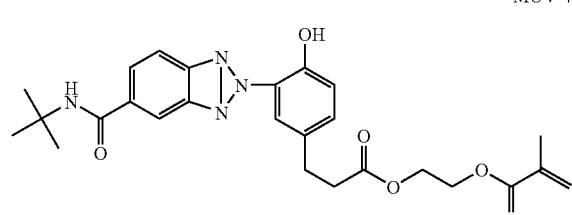
MUV-50
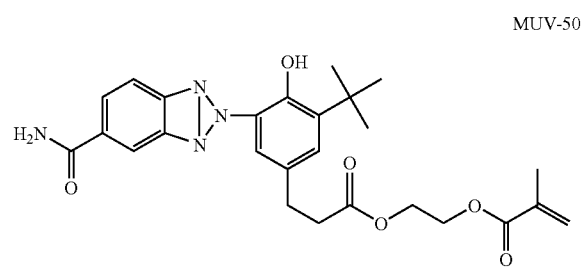

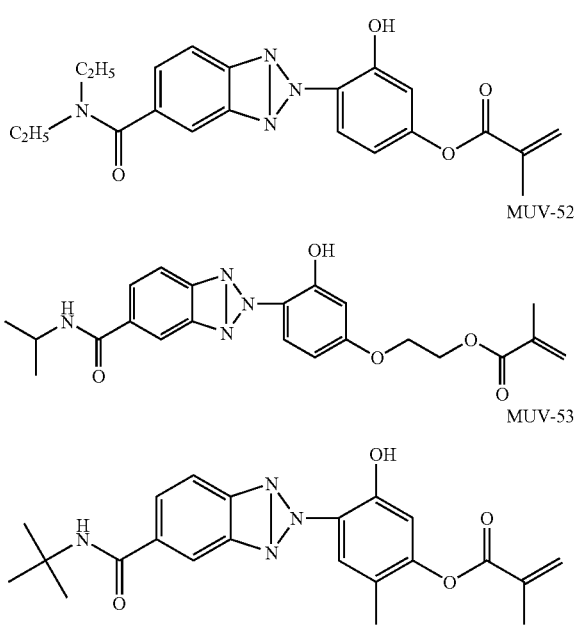

The UV absorber, the DV absorbing monomer, and their intermediates, which are employed in the present invention, can be synthesized by referring to published documents. For example, U.S. Pat. Nos. 3,072,585, 3,159,646, 3,399,173, 3,761,272, 4,028,331, and 5,683,861; European Patent No. 86,300,416; JP-A Nos. 63-227575 and 63-185969; "Polymer Bulletin" V. 20(2), 169-176, and "Chemical Abstracts V. 109, No. 191389 can be referred for the synthesis.

The UV absorber and the UV absorbing polymer, which is employed in the present invention, can be employed together with a low or high molecular weight compound or an inorganic compound, if necessity, when they are blended with the other transparent polymer. For example, it is one of preferable embodiments that the UV absorber and another low molecular weight UV absorber are simultaneously blended with the other transparent polymer, or the UV absorbing polymer and another low molecular weight UV absorber are simultaneously blended with the other transparent polymer. Similarly, it is also one of preferable embodiments that additives such as an antioxidant, a plasticizer, and a flame retardant are simultaneously blended.

The methods, in which the UV absorber and the UV absorbing polymer employed in this invention are added to a cellulose ester film, are that the aforesaid compounds may be incorporated into the cellulose ester film, or may be coated on the cellulose ester film. In the case of incorporation into the cellulose ester film, either direct addition or in-line addition is acceptable. The in-line addition is a method in which the UV absorber and the UV absorbing polymer are previously dissolved in an organic solvent (such as methanol, ethanol, and methylene chloride), and then added to the dope composition using an in-line mixer or the like.

The amount of the UV absorber and the UV absorbing polymer employed in the present invention is not constant but depends on the compounds and the employing conditions. However, in the case of the UV absorber, the amount is preferably 0.2 to 3.0 g, more preferably 0.4 to 2.0 g, and particularly preferably 0.5 to 1.5 g per m² of cellulose ester film. Further, in the case of the UV absorbing polymer, the amount is preferably 0.6 to 9.0 g, more preferably 1.2 to 6.0 g, and particularly preferably 1.5 to 3.0 g per m² of cellulose ester film.

Commercially available UV absorbing monomers usable in the present invention include 1-(2-bezotriazole)-2-hydroxy-5-(2-vinyloxycarbonylethyl)-benzene (UVM-1), a reactive type UV absorber 1-(2-benzotriazole)-2-hydroxy-5-(2-methacryloyloxyethyl)-benzene (RUVA-93), manufactured by Ootsuka Chemical Co., Ltd., and similar compounds to the above. They are preferably employed solely or in a state of polymer or copolymer, but are not limited thereto. For example, as a polymer UV absorber available on the market, PUVA-30M, manufactured by Ootsuka Chemical Co., Ltd., is also preferably employed. The UV absorber may be used in combination of two or more kinds thereof. The adding method of the UV absorber to the dope may be by dissolving the UV absorber in an organic solvent such as alcohol, methylene chloride, dioxolane, or methyl acetate, and then adding it to the dope, or alternatively the UV absorber may be directly added to the dope composition.

(Additives)

An antioxidant may be incorporated in the polarizing plate protective film of the present invention. For example, a peroxide decomposing agent, a radical chain inhibitor, a metal deactivator, or an acid trapping agent may also be incorporated as described in JP-A No. 5-197073. The amount of these compounds to be added is preferably 1 ppm to 1.0%, and more preferably 10 to 1,000 ppm to the cellulose ester by mass.

In the present invention, it is preferable that matting particles is incorporated in the cellulose ester film, and examples of the matting particles include inorganic particles such as silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate, or cross-linked polymer particles. Of these, silicon dioxide is preferable, since the haze of the film can be minimized. The average particle size of the secondary particles of the matting particles is preferably in the range of 0.01 to 1.0 and the amount of these particles incorporated is preferably 0.005 to 0.3% by mass to the cellulose ester. The particles such as silicon dioxide are often surface treated with an organic substance, and these surface treated particles are preferable since they reduce haze of the film. Examples of the organic substance used for the surface treatment include halosilanes, alkoxysilanes (particularly alkoxysilanes having a methyl group), silazanes, and siloxanes. Since particles having a larger average particle size have greater matting effect, while particles having a smaller average particle size have excellent transparency, an average primary particle size of the particles is preferably 5 to 50 nm, and more preferably 7 to 16 nm. It is preferable that these particles usually exist in the cellulose ester film as an aggregate, whereby form unevenness of 0.01 to 1.0 µm on surface of the cellulose ester film. Examples of the silicon dioxide particles include Aerosil 200, 200V, 300, R972, R972V, R974, R202, R812, OX50, and TT600 (manufactured by Aerosil Co., Ltd.), and of these, Aerosil 200V, R972, R972V, R974, R202 and R812 are preferred. These matting agents may be employed in combination of two or more. In the case where 2 or more matting agents are employed, they may be mixed in arbitrary ratios. In this case, matting agents, exhibiting different particle size or quality of material, may be employed. For example, Aerosil 200V and Aerosil R927V may be used in the range from 0.1:99.9 to 99.9:0.1 by mass.

[Method of Producing Polarizing Plate Protective Film]

The method to produce the polarizing plate protective film of the present invention will now be described. The polarizing plate protective film of the present invention can be formed via a solution casting method or a melt casting method, and preferable is the solution casting method, which is further detailed below.

The preparation method of the cellulose ester dope of the present invention is described. In a dissolution vessel, flakes of the cellulose ester are dissolved while stirring into an organic solvent mainly comprising a good solvent for the cellulose ester, to form a dope. The dissolution methods include various methods such as a method performed at normal pressure; a method performed at a temperature lower than the boiling point of the main solvent; another method performed by applying pressure at a temperature higher than the boiling point of the main solvent; a cold dissolution method as described in JP-A No. 9-95544, No. 9-95557, or No. 9-95538; a method performed at high pressure as disclosed in JP-A No. 11-21379. After the dissolution, the dope is filtered with a filtering medium, defoamed, and then sent to the next step with a pump. The cellulose ester concentration in the dope is about 10 to 35% by mass, and more preferably about 15 to 25% by mass. Methods to incorporate a polymer useful for the present invention into the cellulose ester dope include, but are not limited to, a method in which the polymer is dissolved beforehand in an organic solvent and then added to the cellulose ester dope, and a method in which the polymer is directly added to the cellulose ester dope. In this case, the polymer is added so that the polymer does not cause cloudiness or phase separation in the dope. The amount to be added is as described above.

Organic solvents as a good solvent for the cellulose ester include, for example, methyl acetate, ethyl acetate, amyl acetate, ethyl formate, acetone, cyclohexanone, methyl acetoacetate, tetrahydrofuran, 1,3-dioxolane, 4-methyl-1,3-dioxolane, 1,4-dioxane, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 2-pyrrolidone, N-methyl-2-pyrrolidone, 1,3-dimethyl-2-imidazolidinone, methylene chloride, and bromopropane. Of these, methyl acetate, acetone, and methylene chloride are preferable. However, non-chloride organic solvents tend to be preferably employed from the point of view of recent environmental issues. Lower alcohols such as methanol, ethanol, butanol and the like can be favorably used along with these organic solvents, since they can improve the solubility of the cellulose ester in the organic solvent and reduce the viscosity of the dope. It is preferable that organic solvent used with the dope of the present invention is a mixture of a good solvent and a poor solvent for cellulose ester in view of production efficiency, and a favorable range of proportion for mixing the good solvent and the poor solvent is 70 to 98% by mass of the good solvent and 2 to 30%; by mass of the poor solvent. A good solvent in the present invention is defined as a solvent that will dissolve the cellulose ester that is used on its own, while a poor solvent is defined as a solvent that does not dissolve the cellulose ester on its own. Examples of the poor solvent, which is preferably employable for the dope of the present invention, include, but are not particularly limited to, methanol, ethanol, n-butanol, cyclohexane, acetone, cyclohexanone. Regarding a selection of the organic solvent for the polymer of the present invention, a good solvent for cellulose ester is also preferably employed. As described above, in the case where the low molecular weight plasticizer is employed, conventional addition methods may be used, and the plasticizer may be added directly to the dope or dissolved in an organic solvent beforehand and then poured into the dope.

When the various additives described above are added to the cellulose ester dope, it is preferable that a solution, in which the cellulose ester dope and the various additives are dissolved in a small amount of the cellulose ester, is added to the cellulose ester solution in a dissolution vessel, or added through in-line, to achieve a blending. For example, an in-line mixer such as a static mixer SWJ (Toray static in-line mixer, Hi-Mixer, manufactured by Toray Engineering) is preferably used. In the case where the in-line mixer is used, it is preferably applied to a dope in which the cellulose ester is subjected to concentrated dissolution under high pressure, and in this case, any type of pressurizing container may be used as long as it is capable of withstanding a prescribed pressure and can be heated under pressure while stirring.

In the present invention, foreign materials in the cellulose ester dope are required to be removed by filtering. It can be said that the quality of the polarizing plate protective film depends on this filtration. It is preferable that the absolute filtration accuracy of the filtering medium used in this filtration is small, but when the absolute filtration accuracy is excessively small, clogging at the filtering medium is likely to occur, and then the filtering medium must be replaced frequently to cause a problem of reduced productivity. To cope with the problem, the filtering medium for the cellulose ester dope of the present invention preferably exhibits the absolute filtration accuracy of not more than 0.008 mm, more preferably in the range of 0.001 to 0.008 mm, and still more preferably in the range of 0.003 to 0.006 mm. The quality of the filtering medium is not particularly limited, and a conventional filtering medium may be used, and a filtering medium made from plastic fibers such as polypropylene, Teflon (registered trademark) and a filtering medium made of metals such as stainless steel are preferable since there is no falling out of the fibers. Filtration of the cellulose ester dope of the present invention can be performed using conventional methods, and preferred is a method in which filtration is performed under elevated pressure while heating at a temperature in the range of from at least boiling point of the solvent under ordinary pressure to a temperature at which the solvent does not boil at the elevated pressure, since an increase in pressure difference before and after the filtration (hereinafter also referred to as filtration pressure) is small. The preferable temperature range is 45 to 120° C., more preferably 45 to 70° C., and still more preferably 45 to 55° C. The smaller filtration pressure is more preferred. The filtration pressure is preferably not more than $1.6 \times 10^6$ Pa, more preferably not more than $1.2 \times 10^6$ Pa, and still more preferably, not more than $1.0 \times 10^6$ Pa. When a cellulose ester in which acyl groups are unsubstituted or substituted at a low substitution degree is included in cellulose as a raw material, failure caused by foreign materials (hereinafter also referred to as a luminance point) may result. The luminance point is a phenomenon that when a cellulose ester film is placed between two perpendicular polarizing plates (namely the crossed Nicol state), light is irradiated from one side, and the cellulose ester film is observed from the other side via an optical microscope (50 times magnification), if a foreign material is present in the cellulose ester film, light leaks from the material and luminance appears as a spot, while if the cellulose ester film is an unpolluted one, light is blocked and no light is leaked. When the cellulose ester film is arranged in a liquid crystal image display, the larger the diameter of the luminance point, the greater the actual damage. The diameter of the luminance point is preferably not more than 50 μm, preferably not more than 10 μm, and still more preferably not more than 8 μm. The diameter of the luminance point means that the size is measured when the luminance point is approximated to a perfect circle. If the number of the luminance point exhibiting the above-described diameter is not more than 400/cm$^2$, there are no problems in terms of practical use, but the number thereof is preferably not more than 300/cm$^2$, and more preferably not more than 200/cm$^2$. In order to reduce the amount and size of these luminance spots, it is necessary to sufficiently filter fine foreign materials. Further, as described in JP-A. No. 2000-137115, the method in which a proportion of crushed cellulose ester films which were once formed is added again in the dope and used as the materials for the cellulose ester and the additives is preferably used, since the luminance spots can be reduced.

Next, a step for casting the cellulose ester dope on a metal support, a drying step on the metal support, and a peeling step of the web from the metal support will be described. The metal support body is an infinitely moving endless metal belt or a rotating metal drum, with the surface thereof being a mirror surface. The casting step is one in which the above-described dope is pumped to a pressure die through a pressure type metering gear pump, and cast from the pressure die onto a metal support at a casting position. Other casting methods include a doctor blade method in which the thickness of the cast dope film is adjusted with a blade, and a method using a reverse roll coater in which the dope thickness of the cast dope is adjusted with a reverse roller coater rotating reversely, but the pressure die is preferred in view of the fact that the slit shape at the opening portion can be regulated and the film thickness is readily regulated to be uniform. Examples of the pressure die include a coat hanger die, and a "T" die, and any of these may be favorably employed. In order to increase the film forming rate, two or more pressure dies may be provided on the metal support, and the dope may be divided into two or more parts, and then the whole parts may be cast in a multi-layered way. The thickness of the film may be controlled to a desired thickness by controlling the factors such as the dope concentration, the amount of dope pumped, the space of the slit in the die opening, the push-out pressure of the die, and the speed of the metal support body.

The drying step performed on the metal support is one in which a web is heated on the support to evaporate solvents. (A dope film after the dope is cast on a metal support is called a web.) Methods for evaporating solvents include a method in which hot air is blown from the web side and the backside of the support, a method in which heat is transferred from the back surface of the support using a heated liquid, and a method in which heat is transferred from the front side as well as the back side via radiant heat. These methods may be preferably employed in combination. The thinner the web, the faster the drying. The temperature of the metal support may be the same over the entire support or may be different depending on the position.

The drying method on the metal support suitable for the present invention is preferably a method in which, for example, casting is carried out by setting the metal support temperature at 0 to 40° C., and more preferably at 5 to 30° C. The air temperature for drying the web is preferably from about 30 to about 45° C., but is not limited thereto.

The peeling step is one in which the organic solvents in the web have been evaporated on the support, and then the web is peeled apart prior to the metal support going round. After that, the web is sent to the drying step. The position at which the web is peeled apart from the metal support is called the peeling point, and the rollers assisting the peeling of the web are called peeling rollers. Though it depends on the thickness of the web, when the amount of the residual solvent (represented by the formula described below) is excessively large, it may be difficult to peel apart the web, and, on the contrary, when peeling is carried out after the web is fully dried on the support, apart of the web may peel off during the film forming step. The web peeling is generally performed when the residual solvent amount is 20 to 180% by mass. The amount of the residual solvent in the present invention during the peeling step is preferably 20 to 40% by mass or 60 to 150% by mass, and 80 to 140% by mass is particularly preferable. One method for increasing the speed of film formation (the film forming speed can be increased because the peeling is performed during the amount of the residual solvent is as much as possible) is a gel casting method in which peeling can be carried out even when the amount of the residual solvent is large. Examples of the gel casting methods include a method in which a poor solvent with respect to the cellulose ester is added to a dope and gelling is carried out after casting the dope, and a method in which gelling is carried out by decreasing the temperature of a support. Further, there is a method in which a metal salt is added to the dope. By strengthening the web film through making the dope gel on the support, it is possible to carry out peeling earlier, to increase the film-forming speed. In a case where the peeling is carried out at a time when the amount of the residual solvent is still large, if the web is excessively soft, the flatness of the web during peeling is degraded, or wrinkles or longitudinal streaks due to the peeling tension are readily generated. Accordingly, the amount of the residual solvent is determined by balancing economic film-forming speed with quality of the film.

The amount of the residual solvent employed in the present invention is represented by the formula below.

$$\text{Amount of residual solvent (percent by mass)} = \{(M-N)/N\} \times 100$$

In the formula, M represents a mass of the web at any time of a film forming, and N represents a mass of the web after the web having a mass of M is dried for 3 hours at 110° C.

Furthermore, it is preferable that, in the drying step of the cellulose ester film, the film which was peeled apart from the support is further dried to make the amount of the residual solvent of not more than 1% by mass, more preferably 0.1% by mass, and still more preferably not more than 0.01% by mass.

In the web drying step, a method is employed in which the web is dried while conveying using a drying apparatus in which rolls are placed in a staggered way, or a tenter drying apparatus in which, while both edges of the web are held using clips, the web width is maintained or slightly stretched in the width direction. In the present invention, the tenter drying apparatus is particularly preferable, since stability of the optical properties against humidity becomes desirable by maintaining or stretching the web width at any steps or at any points where the amount of the residual solvent is large after the web is peeled apart from the tenter drying apparatus. The means for drying the web is not particularly limited, and the drying is generally carried out employing, for example, hot air, infrared rays, heat rolling or microwaves. The drying is preferably performed employing hot air in view of simplicity. The drying temperature is preferably gradually increased in the range from 40 to 180° C., and more preferably in the range from 50 to 160° C. Further, it is preferable that the drying time at higher temperature is set to be longer, since it exhibits effect of decreasing the retardation values of Rth and Ro.

It is preferable that the polarizing plate protective film of the present invention is drawn by not less than 1% in both MD (in the film transporting direction) and TD (in the perpendicular direction to the film transporting direction) to secure flatness. In a case where a film having no in-plane phase difference is produced, the MD drawing ratio and the TD drawing ratio are preferably close, but the drawing ratios of both MD and TD directions may be different. However, the MD drawing ratio and the TD drawing ratio are appropriately controlled, since the smaller the total of the MD drawing ratio and the TD drawing ratio, the lower the retardation value Rth. Further, in view of Rth reducing effect, the both drawings are preferably carried out at high temperature.

The drawing operation can be separated into several steps, and biaxial drawing is preferably performed in the flow-casting direction and in the crosswise direction. Further, in a case where biaxial drawing is to be performed, it can be performed simultaneously in one operation or stepwise in several steps. In the case of "stepwise" operation, for example, drawing operations in different directions can be performed sequentially, and alternatively, the drawing operation in one direction can be divided into several steps, and the drawing operation in different directions can be included in any one of these steps.

The polarizing plate protective film of the present invention having thinner film thickness is preferable, since a completed polarizing plate made from the aforesaid film becomes thinner, to result in readily achieving a thinner liquid crystal display. However, when the aforesaid film is excessively thin, physical properties thereof such as moisture permeability and tearing strength degrade. The film thickness of the polarizing plate protective film of the present invention which satisfies the above both requirements is preferably 10 to 200 μm, more preferably 10 to 80 μm, and particularly preferably 20 to 60 μm.

It is preferable that the width of the polarizing plate protective film of the present invention is not less than 1.3 m, preferably in a range of 1.4 to 4 m, in view of productivity of a large size liquid crystal display.

The polarizing plate protective film of the present invention preferably exhibits a free volume radius obtained by a positron annihilation lifetime spectroscopy of 0.25 to 0.35 nm. More preferably, the free volume radius thereof is 0.250 to 0.320 nm, and a peak width at half height is 0.04 to 0.1 nm.

The free volume radius represents vacant area which is not occupied by a molecular chain of a cellulose resin. This free volume radius can be determined via a positron annihilation lifetime spectroscopy. Specifically, by measuring the time from injection of positrons into a sample to an annihilation of the positrons, and based on the annihilation lifetime, pieces of information regarding size and numerical concentration of an atom void and a free volume can be determined by nondestructive observation.

<Determination of Free Volume Radius by Positron Annihilation Lifetime Spectroscopy>

A positron annihilation lifetime and relative intensity were determined under the following measurement conditions.

(Measurement Conditions)

Positron source: 22NaCl (intensity; 1.85 MBq)

Gamma-ray detector: Plastic scintillator+Photomultiplier tube

Apparatus time resolution: 290 ps

Measurement temperature: 23° C.

Total number of counts: 1 million counts

Specimen size: 20 pieces of 20 mm×15 mm sized films were piled to prepare an about 2 mm thick sample. The sample was dried under vacuum for 24 hours before a measurement.

Irradiation area: about 10 mm φ

Time per channel: 23.3 picoseconds/channel

According to the above measurement conditions, the positron annihilation lifetime spectroscopy was carried out, and a three component analysis using a nonlinear least-square method was carried out. The annihilation times were referred to as, in small order, $\tau 1$, $\tau 2$ and $\tau 3$, and the corresponding intensities were referred to as I1, I2 and I3 (I1+I2+I3=100%), respectively. Using the largest annihilation time $\tau 3$, a free volume radius R3 (nm) was determined using the following formula. It is considered that the $\tau 3$ corresponds to the positron annihilation lifetime at a void, and the larger the $\tau 3$ value, the larger the void size.

$$\tau 3 = (\tfrac{1}{2})[1-\{R3/(R3+0.166)\}+(\tfrac{1}{2}\pi)\sin\{2\pi R3/(R3+0.166)\}]^{-1}$$

where, 0.166 (nm) corresponds to the thickness of the electronic layer which is exuding from the wall of a void.

The above measurements were repeated twice and, from a peak and a peak shape obtained from a relative intensity and a vacant radius, the mean values and the peak width at half height were calculated.

The positron annihilation spectroscopy is described in, for example, MATERIAL STAGE vol. 4, No. 5, 2004, pp. 21-25, The TRC News, No. 80 (July, 2002) PP. 20-22 (published by Toray Research Center), and "BUNSEKI (Analysis)", 1988, pp. 11-20" under the title of "Evaluation of Free Volume of Polymers Based on Positron Annihilation Spectroscopy", and these may be employed for reference.

The free volume radius of a cellulose ester film used in the present invention is preferably a peak value of 0.25 to 0.35 nm, and the free volume radius preferably distributes within a range of 0.2 nm to 0.4 nm. The peak width at half height preferably is 0.040 to 0.095 nm, more preferably 0.045 to 0.090 nm, still more preferably 0.050 to 0.085 nm.

The method of controlling the free volume radius of a cellulose ester film in a targeted range is not specifically limited, but this may be controlled by the following method.

A cellulose ester film exhibiting a free volume radius of 0.25 to 0.35 nm determined by the positron annihilation lifetime spectroscopy may be obtained by the following steps: casting a dope containing at least a cellulose ester and a plasticizer to form a web; stretching the resulting web while the web contains a solvent; drying the web until the amount of residual solvent decreases to less than 0.3% to obtain a cellulose ester film; further conveying the resulting cellulose ester film at 105 to 170° C. under a circumstance in which the rate of atmosphere replacement of not less than 12 times/h, preferably 12 to 45 times/h, thereby a cellulose ester film exhibiting a free volume radius of 0.25 to 0.31 nm can be obtained. By making the rate of atmosphere replacement less than 12 times/h, or by making the temperature less than 105° C., a cellulose ester film exhibiting a free volume radius exceeding 0.31 nm may be obtained.

The rate of atmosphere replacement, which is provided by the formula below, is the number of times replacing the atmosphere of a heat treatment chamber by fresh-air per unit time, provided that the volume of the heat treatment chamber is expressed as V ($m^3$) and the amount of fresh-air sent to the heat treatment chamber is expressed as FA ($m^3$/hr). The fresh-air means that, among the air sent to the heat treatment chamber, the air is not recycled and circulating, but does not include evaporated solvent plasticizer, or the air from which evaporated solvent or plasticizer are removed.

Rate of atmosphere replacement=$FA/V$ (times/hr)

Further, by controlling the treatment temperature to 105 to 155° C., especially 120 to 160° C., a cellulose ester film exhibiting the free volume radius of 0.25 to 0.31 nm can be obtained.

Further, it is preferable that the cellulose ester film is treated under an atmosphere such that the rate of atmosphere replacement is maintained to 12 times/hr or more in the aforesaid processing step.

The rate of atmosphere replacement of not less than 12 times/hr sufficiently reduces the concentration of the plasticizer in the atmosphere which was evaporated from a film, whereby re-deposition of the plasticizer to the film is reduced. Usually, the drying process is conducted with the rate of atmosphere replacement of not more than 10 times/hr. It is not preferable that higher rate of atmosphere replacement than necessary increases the production cost. Especially when a cellulose ester film employed in the present invention is produced, it is not recommended that the rate of atmosphere replacement is increased more than necessary, since in-plane retardation mottles tends to increase due to the fluttering of the web, but the rate of atmosphere replacement may be increased after the web is thoroughly dried and the amount of residual solvent is considerably decreased. However, the rate of atmosphere replacement of not less than 45 times/hr is not practical since the production cost drastically increases. The treatment time under the condition is preferably 1 minute to 1 hour. When the treatment time is less than 1 minute, it is difficult to reduce the free volume radius, and, when the treatment time is not more than 1 hour, it is preferable that the variation of retardation value due to the treatment is small.

Further, in this treatment process, also a pressurizing treatment in the thickness direction enables to control the free volume radius within more preferable range. The pressure is preferably 0.5 to 10 kPa. The amount of residual solvent, at the pressurizing treatment, is desirably less than 0.3%.

The cellulose ester film of the present invention is preferably employed for a member of a liquid crystal display in view of excellent physical properties such as moisture permeability and dimensional stability. The member of a liquid crystal display means a member employed for a liquid crystal display apparatus, and the examples include a polarizer, a polarizing plate protective film, a phase difference board, a reflection board, a viewing angle increasing film, a hard coat film, an antiglare film, a non-reflective film, a luminance increasing film, and an antistatic film. Of these described above, the aforesaid cellulose ester film is preferably employed for a polarizer, or a polarizing plate protective film. In particular, the polarizing plate protective film of the present invention is suitable for a polarizer used for an in-plane switching mode liquid crystal display apparatus.

[Polarizing Plate]

A polarizing plate of the present invention and a liquid crystal display apparatus employing the same will now be explained.

(Polarizer)

A polarizer as a primary constitution element of the polarizing plate is an element to pass light of a polarized wave plane of a predetermined direction, and a typical polarizing film known at present is a polyvinyl alcohol type polarizing film, which includes a polyvinyl alcohol film dyed with iodine and one dyed with dichroic dye.

In the present invention, an ethylene modified polyvinyl alcohol film having a hot-water breaking temperature of 66 to 73° C., which is cast from ethylene modified polyvinyl alcohol exhibiting, in particular, an ethylene unit content of 1 to 4 mol %, a polymerization degree of 2,000 to 4,000 and a saponification degree of 99.0 to 99.99 mol % is also preferably employed. Further, a difference of hot-water breaking temperature between two points being away from each other by 5 cm in the film TD direction is more preferably not more than 1° C. with respect to decreasing color mottles. Further, a difference of hot-water breaking temperature between two points being away from each other by 1 cm in the film TD direction is more preferably not more than 0.5° C. with respect to decreasing color mottles. Further, the film thickness of 10 to 50 μm is particularly preferable with respect to decreasing color mottles.

The ethylene-modified polyvinyl alcohol (ethylene-modified PVA) usable for the present invention is prepared in such a manner that an ethylene-vinyl ester polymer, prepared by copolymerizing ethylene and vinyl ester based monomers, is saponified, whereby vinyl ester units are changed to vinyl alcohol units. Examples of a vinyl ester monomer include: vinyl formate, vinyl acetate, vinyl propionate, vinyl valerate, vinyl laurate, vinyl stearate, vinyl benzoate, vinyl pivalate, and vinyl versatate. Of these, vinyl acetate is preferably employed.

The content of ethylene units in the ethylene-modified PVA (copolymerized amount of ethylene) is commonly 1 to 4 mol %, preferably 1.5 to 3 mol %, and more preferably 2 to 3 mol %. When the content of the ethylene units is less than 1 mol %, the polarizing performance, the durability enhancing effects, and color mottles decreasing effects of the resulting polarizing film are undesirably degraded. On the other hand, when it exceeds 4 mol %, affinity of the ethylene-modified PVA to water is reduced, whereby the uniformity the film surface is undesirably degraded to tend to cause the formation of color mottles of the polarizing film.

Further, during copolymerization of ethylene with vinyl ester based monomers, if desired, it is possible to copolymerize copolymerizable monomers in the range (at a ratio of preferably not more than 15 mol %, and more preferably not more than 5 mol %) in which the effects of the present invention is adversely affected.

Examples of such copolymerizable monomers with vinyl ester monomers include olefins having 3 to 30 carbon atoms such as propylene, 1-butene, or isobutene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; methacrylic acid and salts thereof; methacrylic acid esters such as methyl methacrylate, ethyl methacrylate, n-propyl methacrylate, i-propyl methacrylate, n-butyl acrylate, i-butyl acrylate, t-butyl acrylate, 2-ethylhexyl methacrylate, dodecyl methacrylate, or octadecyl methacrylate; acrylamide derivatives such as acrylamide, N-methylacrylamide, N-ethylacrylamide, N,N-dimethylacrylamide, diacetoneacrylamide, acrylamide propane sulfinic acid and salts thereof, acrylamidopropyldimethylanine and salts thereof, N-methylol acrylamide and derivatives thereof; methacrylamide derivatives such as methacrylamide, N-methylmethacrylamide, N-ethylmethacrylamide, methacrylamidopropane sulfonic acid and salts thereof, methacrylamidopropyldimethylamine and salts thereof, or N-methylol methacrylamide and derivatives thereof; N-vinylamides such as N-vinylformamide, N-vinylacetamide, or n-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; nitrites such as acrylonitrile or methacrylonitrile; halogenated vinyls such as vinyl chloride, vinylidene chloride, vinyl fluoride, or vinylidene fluoride; allyl compounds such as allyl acetate or allyl chloride; maleic acid, and salts and esters thereof; itaconic acid, and salts and esters thereof; vinylsilyl compounds such as vinylmethoxysilane; and N-vinylamides such as isopropenyl acetate, N-vinylformamide, N-vinylacetamide, or N-vinylpyrrolidone.

The degree of polymerization of ethylene-modified PVA constituting the polarizer is commonly 2,000 to 4,000, preferably 2,200 to 3,500, and particularly preferably 2,500 to 3,000 in view of polarizing performance and durability. When the degree of polymerization of ethylene-modified PVA is less than 2,000, the polarizing performance and durability of the polarizing film are undesirably degraded. On the other hand, the degree of polymerization of not more than 4,000 is preferred since color mottles of the polarizer are hardly formed.

The degree of polymerization of the ethylene-modified PVA refers to the weight average polymerization degree determined by a GPC measurement. This weight average polymerization degree is a value, determined by a GPC measurement at 40° C. employing hexafluoroisopropanol (HFIP) added with 20 mmol/liter of sodium trifluoroacetate in a moving phase employing monodispersed PMMA as a standard product.

In view of polarization performance and durability of a polarizing film, the ratio of saponification of the ethylene-modified PVA constituting the polarizer is preferably 99.0 to 99.99 mol %, more preferably 99.9 to 99.99 mol %, and particularly preferably 99.95 to 99.99 mol %.

Methods of producing a ethylene-modified PVA film, other than a film forming method based on a melt, extrusion system employing water-containing ethylene-modified PVA, include, for example, using an ethylene-modified PVA solution prepared by dissolving ethylene-modified PVA in solvents, a casting film forming method, a wet system film forming method (ejected into poor solvents), a gel film forming method (after an ethylene-modified PVA solution is temporality cooled and gelled, solvents are removed via extraction and an ethylene-modified PVA film is prepared), as well as methods of combinations of these. Of these, in view of obtaining an excellent ethylene-modified PVA film, preferred are the casting method and the melt extrusion method. The resulting ethylene-modified PVA film is, if necessary, dried and thermally treated.

Examples of a solvent which dissolves the ethylene-modified PVA employed during production of ethylene-modified PVA film include: dimethylsulfoxide, dimethylformamide, dimethylacetamide, N-methylpyrrolidone, ethylene glycol, glycerin, propylene glycol, diethylene glycol, triethylene glycol, tetraethylene glycol, trimethylolpropane, ethylenediamine, diethylenetriamine, glycerin and water. These may be employed alone or in combination of two or more. Of these, dimethylsulfoxide, water, or a mixed solvent of glycerin and water are suitably employed.

The ratio of ethylene-modified PVA, incorporated in an ethylene-modified PVA solution or water-containing ethylene-modified PVA employed during production of the ethylene-modified film, varies depending on the degree of polymerization of the ethylene-modified PVA, but is preferably 20 to 70% by mass, more preferably 25 to 60% by mass, still more preferably 30 to 55% by mass, and most preferably 35 to 50% by mass. When the ratio of the ethylene-modified PVA exceeds 70% by mass, viscosity of the ethylene-modified PVA solution or the water-containing ethylene-modified PVA becomes excessively high, whereby it becomes difficult to prepare a film without foreign materials and defects due to difficult filtration and defoaming during preparation of stock solution of a film. On the other hand, when the ratio of the ethylene-modified PVA is at most 20% by mass, the viscosity of the ethylene-modified PVA solution or the water-containing ethylene-modified PVA becomes excessively low, whereby it becomes difficult to prepare a PVA film having a targeted thickness. Further, if desired, additives such as a plasticizer, a surfactant, and a dichroic dye may be incorporated in the above ethylene-modified PVA solution or water-containing ethylene-modified PVA.

During production of the ethylene-modified PVA film, it is preferable to incorporate a polyalcohol as a plasticizer. Examples of a polyalcohol include ethylene glycol, glycerin, propylene glycol, diethylene glycol, diglycerin, triethylene glycol, tetraethylene glycol, and trimethylolpropane. These may be employed individually or in combination of at least two types. Of these, in view of a drawing property enhancement effect, diglycerin, ethylene glycol, or glycerin is preferably employed.

The amount of a polyalcohol to be added is preferably 1 to 30 parts by mass with respect to 100 parts by mass of the ethylene-modified PVA, more preferably 3 to 25 parts by mass, and most preferably 5 to 20 parts by mass. When the amount to be added is less than 1 part by mass, dying properties or drawing properties may be degraded, while when it exceeds 30 parts by mass, the ethylene-modified film becomes excessively flexible, whereby handling properties tend to be degraded.

During production of the ethylene-modified PVA film, it is preferable to incorporate a surfactant. The types of surfactants are not particularly limited, but nonionic or cationic surfactants are preferred. Examples of suitable anionic surfactants include carboxylic acid surfactants such as potassium laurate; sulfuric acid ester surfactants such as octyl sulfate; and sulfonic acid surfactants such as dodecylbenzene sulfonate. Examples of suitable nonionic surfactants include alkyl ether surfactants such as polyoxyethylene oleyl ether; alkyl phenyl ether surfactants such as polyoxyethylene octyl phenyl ether surfactants; alkyl ester surfactants such as polyoxyethylenelaurate; alkylamine surfactants such as polyoxyethylene lauryl aminoether; alkylamide surfactants such as polyoxyethylene lauric acid amide; polypropylene glycol ether surfactants such as polyoxyethylene polyoxypropylene ether; alkanol amide surfactants such as oleic acid diethanolamide; and allyl phenyl ether surfactants such as polyoxyalkylene phenyl ether. These surfactants may be employed individually or in combinations of at least two types.

The amount of surfactants to be added is preferably 0.01 to 1 parts by mass with respect to 100 parts by mass of the ethylene-modified PVA, more preferably 0.02 to 0.5 parts by mass, and most preferably 0.05 to 0.3 parts by mass. When the amount to be added is less than 0.01 parts by weight, effects to improve film forming properties and peeling properties are hardly exhibited, while when it exceeds 1 part by mass, surfactants are dissolved out onto the surface of the ethylene-modified PVA film to result in blocking, whereby handling properties may be degraded.

The hot-water cutting temperature of the ethylene-modified PVA film is preferably 66 to 73° C., more preferably 68 to 73° C., and still more preferably 70 to 73° C. When the hot-water cutting temperature of the ethylene-modified PVA film is less than 66° C., a stretching is carried out in a state such that the nearly dissolved film is stretched, whereby the polarization performance of the polarizing film becomes insufficient since molecular orientation thereof tend not to occur. On the other hand, when the hot-water cutting temperature is higher than 73° C., it becomes difficult to stretch the film, whereby the polarization, performance of the polarizing film is undesirably degraded. When the ethylene-modified PVA film is dried and thermally treated, it is possible to control the hot-water cutting temperature of the film by varying the temperature and time of the above treatments.

The thickness of the ethylene-modified PVA film employed to prepare a polarizer is preferably 10 to 50 μm, and more preferably 20 to 40 µm. When the thickness is less than 10 µm, it is difficult to uniformly stretch the film due to excessively low film strength, whereby color mottles of the polarizing film tends to occur. On the other hand, when the thickness exceeds 50 µm, the variation of thickness due to neck-in at the edge tends to occur during production of a polarizing film via uniaxial stretching of the ethylene-modified PVA film, whereby color mottles of the polarizing film are tend to be undesirably highlighted.

To produce a polarizing film employing an ethylene modified PVA film, for example, the ethylene-modified PVA film may be dyed, uniaxially stretched, fixed, and then dried, and, if desired, thermally treated. The order of the dying, uniaxial stretching, and fixing is not particularly limited. Further, the uniaxial stretching may be repeated twice or more.

Dying may be performed at any time such as prior to uniaxial stretching, during uniaxial stretching, or after uniaxial stretching. Dyes usable for dying include dichroic dyes, which include iodine-potassium iodide; Direct Black 17, 19, and 154; Direct Brown 44, 106, 195, 210, and 223; Direct Red 2, 23, 28, 31, 37, 39, 79, 81, 240, 242, and 247; Direct Blue 1, 15, 22, 78, 90, 98, 151, 168, 202, 236, 249, and 270; Direct Violet 9, 12, 51, and 98; Direct Green 1 and 85; Direct Yellow 8, 12, 44, 86, and 87; and Direct Orange 26, 39, 106, and 107. These may be employed individually or in combinations of at least two types. Dying is commonly performed by immersing a PVA film into a solution incorporating the above dyes, but the above dying conditions and methods are not particularly limited, and include a method in which the above dye may be blended into a PVA film before film forming.

It is possible to conduct uniaxial stretching employing either a wet stretching method or a dry heat stretching method, and in heated water (in a solution containing the above-mentioned dyes or in a fixing bath which will be described below) or in air employing an ethylene-modified PVA film which absorbed water. The temperature during stretching is not particularly limited, but when the ethylene-modified PVA film is stretched in heated water (wet system stretching), the stretching temperature is suitably 30 to 90° C., while in the case of dry heat stretching, the stretching temperature is suitably 50 to 180° C. The stretching factor (the total stretching factor in the case of multistage uniaxial stretching) is preferably not less than 4 in view of polarization performance of the polarizing film, and most preferably not less than 5. The upper limit of the stretching factor is not particularly limited, but the stretching factor is preferably not more than 8, since uniform stretching is readily performed. The film thickness after stretched is preferably 5 to 20 µm, and most preferably 5 to 15 µm.

To strengthen adsorption of the above dyes onto the ethylene-modified PVA film, a fixing treatment is frequently conducted. Commonly, boric acid and/or boron compounds are added to a treatment bath employed for the fixing treatment. Iodine compounds may also be added, if necessary, in the treatment bath.

Drying of the polarizer thus produced is preferably performed at 30 to 150° C., and more preferably 50 to 150° C.

The polarizer thus prepared is employed as a polarizing plate, generally with an optically transparent protective layer exhibiting high mechanical strength being adhered to one or both sides of the polarizer. Adhesives for the above adhesion include a PVA adhesive and a urethane adhesive. Of these, a PVA adhesive is preferably employed.

The polarizing plate can be produced by common methods. It is preferable that the back surface of the polarizing plate protective film of the present invention is subjected to the alkali saponification treatment, and the thus treated polarizing plate protective film is pasted, using an aqueous solution of completely saponified polyvinyl alcohol, to at least one of surfaces of a polarizer which was prepared by stretching after immersed in the above-mentioned iodine solution. Also on the other surface, the polarizing plate protective film of the present invention may be provided, or other polarizing plate protective film may be provided. Though a polarizing plate protective film of the present invention is used on one surface, any commercially available cellulose ester film can be used on the other surface as a polarizing plate protective film. Examples of a cellulose ester film available on the market, which are preferably usable, include KC8UX2M, KC4UX, KC5UX, KC4UY, KC8UY, KC10UDR, KC8UCR-3, KC8UCR-4, KC8UCR-5, KC8UY-HA, and KC8UX-RHA (each manufactured by Konica Minolta Opto, Inc.).

The polarizing plate protective film provided on the other surface, of the polarizer preferably has a hard coat layer or an antiglare layer of 8 to 20 µm in thickness. Preferably employed is a polarizing plate protective film having a hard coat layer or an antiglare layer disclosed, for example, in JP-A Nos. 2003-114333, 2004-203009, 2004-354699 or 2004-354828. Further, it is preferable that the aforesaid hard coat layer or the aforesaid antiglare layer is overlaid with an anti-reflection layer containing at least a low refractive index layer, and it is particularly preferable that the aforesaid low refractive index layer incorporates hollow particles.

Alternatively, it is also preferable to use a polarizing plate protective film which also serves as an optical compensation film having an optical anisotropic layer formed by orientating a liquid crystal compound such as a discotic liquid crystal, a rod-shaped liquid crystal or a cholesteric liquid crystal. For example, the optical anisotropic layer can be formed by the method described in JP-A No. 2003-98348. The polarizing plate superior in the flatness and exhibiting a stable viewing angle enlarging effect can be provided by the use of such film in combination with the polarizing plate protective film of the present invention. Moreover, a film, other than a cellulose ester film, made of, for example, a cyclic olefin resin, an acryl resin, a polyester, or a polycarbonate may be used as the polarizing plate protective film on the other surface of the polarizer. In such a case, the film is preferably pasted to the polarizing plate through a suitable adhering layer since such a film exhibits low suitability for saponification treatment.

Since the polarizer is stretched in one direction (usually in the longitudinal direction), when a polarizing plate is exposed to a high temperature and high humidity environment, the polarizing plate shrinks in the stretching direction (usually in the longitudinal direction), and expands in the direction perpendicular to the stretching direction (usually in the transverse direction). The thinner the polarizing plate protective film, the larger the rate of expansion and contraction of the polarizing plate, and in particular, the contraction in the longitudinal direction of the polarizing film is large. It is important to restrain the rate of expansion and contraction of the film particularly in the casting direction to make the polarizing plate protective film thinner, since the polarizer is generally pasted to the polarizing plate protective film with the stretching direction of the polarizer being adjusted to the casting direction (MD direction) of the polarizing plate protective film. The cellulose ester film of the present invention is suitably employed as the polarizing plate protective film as described above, since it is superior in the dimensional stability.

A polarizing plate may be constituted by pasting a protection film on one surface and a separation film on the other surface of the aforesaid polarizing plate. The protection film and the separation film are used to protect the polarizing plate during shipping and product inspection of the polarizing plate. In this case, the protection film is pasted to the polarizing plate for protecting the surface thereof, and employed on the surface opposite to the surface where the polarizing plate is pasted to the liquid crystal cell. A separation film is employed for covering the adhesive layer for pasting the polarizing plate to the liquid crystal cell, and applied onto the surface of the polarizing plate to be pasted to the liquid crystal cell.

(In-Plane Switching Mode Liquid Crystal Display)

The liquid crystal display of the present invention having superior visibility and enlarged viewing angle can be produced by incorporation of the polarizing plate of the present invention into an In-Plane Switching mode (the so-called IPS) liquid crystal display available on the market.

The in-plane switching mode liquid crystal display of the present invention includes a fringe-field switching (FFS) mode liquid crystal-display; therefore, the polarizing plate of the present invention can also be incorporated in the FFS mode liquid crystal display like the IPS mode, to produce the liquid crystal display of the present invention exhibiting the similar effect to that of the IPS mode liquid crystal display.

In a case where the polarizing plate protective film of the present invention is arranged in the liquid crystal cell, an upper side polarizer and a lower side polarizer are usually constituted which are provided in the upper side and the lower side of a pair of substrates which are located on the both sides of the liquid crystal cell for driving the display. It is preferable that at least one polarizing plate protective film of the present invention is arranged between the aforesaid substrate and either of the upper side polarizer or the lower side polarizer, or, alternatively, between the aforesaid substrate and each of the upper side polarizer and the lower side polarizer.

EXAMPLES

The embodiments of the present invention are described below with reference to examples, but the invention is not limited to them. Description of "%" in examples denotes "% by mass" unless otherwise stated.

Example 1

<Synthesis of Polymer X>

Into a glass flask equipped with a stirrer, two dropping funnels, a gas introducing tube, and a thermometer, 40 g of a mixture of monomer Xa and monomer Xb, whose kind and ratio were described in Table 1, 0.7 to 1.7 g of a mercaptopropionic acid as a chain transfer agent, and 30 g of toluene were introduced, and the resulting solution was heated to 90° C. Then, from one of the dropping funnels, 60 g of a mixture of monomer Xa and monomer Xb, whose kind and ratio were described in Table 1, was added dropwise over 3 hours, and at the same time, from another dropping funnel, 0.2 to 1.0 g of azobisisobutyronitrile dissolved into 14 g of toluene was added dropwise over 3 hours. After that, 0.6 g of azobisisobutyronitrile dissolved into 56 g of toluene was further added dropwise over 2 hours, followed by continuation of reaction properly to prepare the polymer X. A weight average molecular weight of the aforesaid polymer X was determined via the measuring method described below.

The molecular weight of the polymer was controlled by added amounts of the chain transfer agent and the polymerization initiator. St, HEMA, H-St, HEA, MAA, ATBC, and TPP, described in Table 1, are abbreviations of compounds below.

St: styrene
HEMA: 2-hydroxyethylmethacryrate
H-St: hydroxystyrene
HEA: 2-hydroxyethylacryrate
MAA: methacrylic acid
ATBC: acetyltributylcitrate
TPP: triphenylphosphate (Determination of Molecular Weight)

The determination of the weight average molecular weight was carried out using gel permeation chromatography.

The measuring conditions are given below.

Solvent: methylene chloride
Column: Shodex, K806, K805, and K803G (Three columns manufactured by Showa Denko Co., Ltd. were employed in series.)
Column temperature: 25° C.
Sample concentration: 0.1 percent by mass
Detector: RI Model 504 (manufactured by GL Science Co., Ltd.)
Pump: L6000 (manufactured by Hitachi, Ltd.)
Flow rate: 1.0 ml/minute
Calibration curve: Standard Polystyrene STK (standard polystyrene: produced by Tosoh Corporation): Calibration curves based on 13 samples of Mw=1,000,000–500 are used. These 13 samples are used at an almost equally spaced interval.

<Synthesis of Polymer UV absorber P-1>

2(2'-hydroxy-5'-t-butyl-phenyl)-5-carboxylic acid-(2-metacryloyloxy)ethylester-2H-benzotriazol (illustrated compound MUV-19) was synthesized according to a method described below.

20.0 g of 3-nitro-4-amino-bonzoic acid was dissolved in 160 ml of water, and then 43 ml of concentrated hydrochloric acid was added into the solution. After 8.0 g of sodium nitrite dissolved into 20 ml of water was added at 0° C. into the resulting solution, the solution was stirred for 2 hours with the temperature being maintained at 0° C. The resulting solution was added dropwise into a solution in which 17.3 g of 4-t-buthylphenol was dissolved into 50 ml of water and 100 ml of ethanol at 0° C. while the solution was controlled to be alkaline with potassium carbonate. The resulting solution was stirred at 0° C. for one hour, followed by stirring at room temperature for one hour. The reaction solution was made acidic with hydrochloric acid, and the precipitate produced was filtered, and then well washed with water.

The filtered precipitate was dissolved into a 500 ml aqueous solution of 1 mol/l of NaOH, and then 110 g of 40% NaOH aqueous solution was added dropwise into the above solution after 35 g of zinc powder was added thereinto. After the completion of the dropping, the resulting solution was stirred for about 2 hours, filtered, washed with water, and then the filtered solution was neutralized with hydrochloric acid. The separated precipitate was filtered, washed with water, and dried, followed by recrystallization using a mixed solvent of ethyl acetate and acetone to prepare 2(2'-hydroxy-5'-t-butyl-phenyl)-5-carboxylic acid-2H-benzotriazol.

Next, 10.0 g of the 2(2'-hydroxy-5'-t-butyl-phenyl)-5-carboxylic acid-2H-benzotriazol, 0.1 g of hydroquinone, 4.6 g of 2-hydroxyethylmethacryrate, and 0.5 g of p-toluenesulfonic acid were added into 100 ml of toluene, and the solution was refluxed with heating for 10 hours in a reaction vessel equipped with an ester-tube. The resulting reaction solution was poured into water, and the precipitated crystals were filtered, washed with water, dried, and then recrystallized using ethyl acetate, to prepare the exemplified compound MUV-19 of 2(2'-hydroxy-5'-t-butyl-phenyl)-5-carboxylic acid-(2-metacryloyloxy)ethylester-2H-benzotriazol.

Next, a copolymer (polymer UV absorber P-1) of the 2(2'-hydroxy-5'-t-butyl-phenyl)-5-carboxylic acid-(2-metacryloyloxy)ethylester-2H-benzotriazol with methyl methacrylate was synthesized according to a method described below.

Into 80 ml of tetrahydrofuran, 4.0 g of the 2(2'-hydroxy-5'-t-butyl-phenyl)-5-carboxylic acid-(2-metacryloyloxy)ethylester-2H-benzotriazol synthesized in the above Synthesizing Example 3 and 6.0 g of methyl methacrylate were added, followed by addition of 1.14 g of azo-isobutyronitrile, which was then refluxed with heating for 9 hours under nitrogen gas atmosphere. After the tetrahydrofuran was removed by reduced pressure distillation, the residual compound was re-dissolved into 20 ml of tetrahydrofuran, and the resulting solution was added dropwise into an excessive amount of methanol. The separated precipitate was filtered off, dried in vacuum at 40° C., to prepare 9.1 g of grayish white powdered polymer UV absorber P-1. It was confirmed that the copolymer had a number average molecular weight of 4,500 via GPC analysis using standard polystyrene. It was also confirmed that the above-described copolymer is a copolymer of Lester-2H-benzotriazol with methyl methacrylate via NMR spectra and 2(2'-hydroxy-5'-t-butyl-phenyl)-5-carboxylic acid-(2-metacryloyloxy)ethy UV spectra. The composition of the above copolymer was approximately 2(2'-hydroxy-5'-t-butyl-phenyl)-5-carboxylic acid-(2-metacryloyloxy)ethylester-2H-benzotriazol:methyl methacrylate=40:60.

(Preparation of Cellulose Ester Film 1 to 16)
(Preparation of Dope Solution)

| | |
|---|---|
| Cellulose Ester (cellulosetriacetate synthesized from linter cotton): (Mn = 148,000, Mw = 310,000, Mw/Mn = 2.1, and a degree of acyl group substitution = 2.92) | 100 parts by mass |
| Polymer X: refer to Table 1 with respect to a kind and an amount | |
| Additive: refer to Table 1 with respect to a kind and an amount | |
| Polymer UV absorber P-1: | 3 parts by mass |
| Silica particles (Aerosil R972V: produced by Nippon Aerosil Co., Ltd.): | 0.1 parts by mass |
| Methylene chloride: | 600 parts by mass |
| Ethanol: | 60 parts by mass |

(Preparation of Polarizing Plate Protective Film)

The above-described dope solution was prepared using the polymer X and an additive, both of which are described in Table 1 and with a ratio of them described in Table 1, and then filtered by Finemet NF, manufactured by Nihon. Seisen Co., Ltd., and uniformly cast in a width of 2 m at 22° C. on a stainless steel band support using a belt casting machine. The solvent in the cast dope was evaporated to 100% of the residual solvent amount on the stainless steel band support, and the resulting web was peeled off from the stainless steel band support at a peeling tension of 162 N/m. The solvent in the peeled cellulose ester web was evaporated at 35° C., and then the web was slit to 1.6 m width. Thereafter, the slit film was dried at a drying temperature of 135° C. while being stretched at a factor of 1.05 in the lateral direction of the film employing a tenter. At the beginning of stretching employing the tenter, the amount of the residual solvent was 10%. After the film was relaxed for 5 minutes at 130° C., which was stretched by the tenter, the drying of the film was completed while conveying the film with many rollers through dry zones which were set to 120° C. and 130° C. The dried film was slit to 1.5 m width, and was subjected to knurling treatment on both edges of the film with a width of 10 mm and a height of 5 μm. The resulting film was wound onto a core exhibiting an inner diameter of 6 inches at an initial tension of 220 N/m and a final tension of 110 N/m, to obtain Polarizing plate protective films (cellulose ester films) 1 to 16 which were described in Table 1.

The stretching factor in the MD direction, calculated based on the rotation rate of the stainless steel band support and the driving rate of the tenter, was 1.05. The amount of the residual solvent, the film thickness, and the roll length of each polarizing plate protective film listed in Table 1 were 0.1%, 60 μm, and 4,000 m, respectively.

<Evaluation and Measurement Method>

Evaluations and measurements were carried out on the prepared polarizing plate protective films.

(Dimensional Change Due to Humidity)

Markings were made on the film at an interval of about 10 cm, and the film with the markings was stored under atmosphere of 23° C. and 80% RH for 12 hours, and then the distance S1 between the aforementioned markings was accurately measured under the above atmospheric conditions via a stereoscopic microscope. Subsequently, the aforesaid film was stored under atmosphere of 23° C. and 20% RH for 12 hours, and then again the distance S2 between the aforementioned markings was accurately measured under the above atmospheric conditions via a stereoscopic microscope. The dimensional change due to humidity (%) was determined according to a formula below.

Dimensional change due to humidity $(\%)=(S1/S2-1)\times 100$ (Change after 100 Hours at 80° C. and 90% RH)

The prepared film was observed whether any changes occurred on the film after the film was stored under atmosphere of 80° C. and 90% RH for 100 hours.

A: No change was observed.
B: Some change on the surface was noticed.

(Retardation Rth and Film Thickness d)

Measurement of the three-dimensional refractive index at 10 points of the prepared film was carried out under the atmosphere of 23° C. and 55% RH at a wavelength of 590 nm via an automatic birefringence meter (KOBRA-21ADH: produced by Oji Keisokukiki Co., Ltd.), to obtain refractive indices nx, ny and nz. The retardation value Rth in the direction of the thickness of the film was calculated according to the formula below. The retardation value of each film was shown in Table 1 in the average of values measured at 10 points.

$Rth=\{(nx+ny)/2-nz\}\times d$ (wherein, nx is the refractive index in a film in-plane slow axis direction, ny is the refractive index in a film in-plane fast axis direction, nz is the refractive index in a film thickness direction, and d is the thickness of the film (nm).)

(Haze)

Haze of each film sample prepared above was measured according to JIS K-6714 via a haze meter (Type 1001DP: Nihon Denshoku Kogyo Co., Ltd.).

The results of the above evaluations and measurements are given in Table 1.

TABLE 1

| No. of Polarizer Protection Film | Polymer X | | | | | | | | Additive | | Film Thickness d μm | Dimensional Change due to Humidity % | Rth nm | Haze % | *1 | Note |
|---|---|---|---|---|---|---|---|---|---|---|---|---|---|---|---|---|
| | Xa | | Xb | | Xc | | | | | | | | | | | |
| | Kind | Mol % | Kind | Mol % | Kind | Mol % | Mw | Amount added Parts by Mass | Kind | Amount added Parts by Mass | | | | | | |
| 1 | St | 80 | HEMA | 20 | — | — | 1000 | 15 | ATBC | 10 | 60 | 0.5 | −21 | 0.3 | A | Inv. |
| 2 | St | 80 | HEMA | 20 | — | — | 5000 | 15 | ATBC | 10 | 60 | 0.4 | −26 | 0.3 | A | Inv. |
| 3 | St | 80 | HEMA | 20 | — | — | 10000 | 15 | ATBC | 10 | 60 | 0.4 | −31 | 0.3 | A | Inv. |
| 4 | St | 50 | H-St | 50 | — | — | 5000 | 10 | ATBC | 15 | 60 | 0.4 | −31 | 0.3 | A | Inv. |
| 5 | St | 50 | H-St | 50 | — | — | 10000 | 10 | TPP | 10 | 60 | 0.6 | −22 | 0.3 | A | Inv. |
| 6 | St | 40 | H-St HEMA | 40 20 | — | — | 5000 | 10 | ATBC | 10 | 60 | 0.3 | −26 | 0.3 | A | Inv. |
| 7 | St | 80 | HEMA | 20 | — | — | 100000 | 5 | ATBC | 5 | 60 | 0.4 | −32 | 0.6 | A | Inv. |
| 8 | St | 90 | HEA | 10 | — | — | 1000 | 10 | TPP | 10 | 40 | 0.6 | −19 | 0.3 | A | Inv. |
| 9 | St | 60 | MAA | 40 | — | — | 10000 | 15 | ATBC | 10 | 40 | 0.5 | −23 | 0.3 | A | Inv. |
| 10 | St | 95 | H-St | 5 | — | — | 5000 | 10 | TPP | 10 | 40 | 0.4 | −31 | 0.3 | A | Inv. |
| 11 | St | 100 | — | — | — | — | 1000 | 10 | TPP | 10 | 60 | 0.6 | −22 | 0.3 | B | Comp. |
| 12 | — | — | — | — | — | — | — | — | TPP | 10 | 60 | 1.5 | 45 | 0.3 | B | Comp. |
| 13 | M-St | 80 | HEMA | 20 | — | — | 5000 | 15 | ATBC | 10 | 60 | 0.6 | −22 | 0.6 | A | Inv. |
| 14 | St | 80 | HEMA | 20 | — | — | 5000 | 15 | ATBC | 10 | 20 | 0.4 | −13 | 0.3 | A | Inv. |
| 15 | St | 80 | HEMA | 20 | — | — | 5000 | 15 | ATBC | 10 | 40 | 0.4 | −23 | 0.3 | A | Inv. |
| 16 | St | 80 | HEMA | 20 | — | — | 5000 | 15 | ATBC | 10 | 80 | 0.8 | −38 | 0.4 | A | Inv. |
| 17 | St | 20 | HEMA | 30 | MMA | 50 | 5000 | 15 | ATBC | 10 | 40 | 0.4 | −22 | 0.3 | A | Inv. |
| 18 | St | 40 | HEMA | 20 | MMA | 40 | 100000 | 95 | — | — | 40 | 0.3 | −150 | 0.3 | A | Inv. |
| 19 | St | 40 | HEMA | 20 | MMA | 40 | 100000 | 50 | — | — | 40 | 0.3 | −70 | 0.4 | A | Inv. |

1*: Change after 100 hours at 80° C./90% RH,
Inv.: Present Invention,
Comp.: Comparative Example Table 1 shows that Polarizing plate protective films (cellulose ester films) 1 to 10 and 13 to 16 of Present Invention incorporating the polymer X of the present invention are superior in dimensional stability against humidity, and resistance against high temperature and high humidity, compared to Polarizing plate protective films (cellulose ester films) 11 and 12 of Comparative Example. Further, any samples exhibited negative birefringence and good haze.

Example 2

<Preparation of Polarizing Plate>
Polarizing Plates were prepared employing Polarizing plate protective films (cellulose ester films) 1 to 10, and 13 to 16 of the present invention, which were prepared in Example 1.

A polyvinyl alcohol film of 120 μm in thickness was immersed in a 100 kg of aqueous solution containing 1 kg of iodine and 4 kg of boric acid, and then stretched by 6 times at 50° C., to prepare a polarizer. On one surface of each polarizer prepared above, each of the above Cellulose ester films 1 to 10, and 13 to 16, which were subjected to alkaline saponification treatment, was pasted using a 5% aqueous solution of completely saponified polyvinyl alcohol as an adhesive.

An antireflection film having a hard coat layer mentioned below was prepared, and was pasted on the other surface of the above polarizer, to prepare a polarizing plate.
<Alkaline Saponification Treatment>
Saponification step: with 2N—NaOH at 50° C. for 90 seconds
Washing step: with water at 30° C. for 45 seconds
Neutralizing step: with 10% HCl at 30° C. for 45 seconds
Washing step: with water at 30° C. for 45 seconds
The film sample was subjected to the saponification, washing, neutralizing, and washing treatments in this order with the above conditions, and then dried at 80° C.

<<Preparation of Antireflection Film>>
An antireflection film was prepared employing a cellulose ester film KC8UX2M (produced by Konica Minolta Opto, Inc.) according to the procedure described below.
Refractive index of each layer constituting an antireflection layer was determined by a method described below.
(Refractive Index)
The refractive index of each layer exhibiting a refractive index was determined from a measurement result of the spectral reflectivity via a spectrophotometer on individual sample prepared with the above each layer being applied on a hard coat film which was prepared below. The reflectivity measurement was carried out in such a manner that after the rear surface to the measurement side of the sample being subjected to roughening treatment, the rear surface was subjected to light absorption treatment with a black spray to prevent light reflection at the rear surface, and then the reflectivity in the visible light region (400 nm to 700 nm) was measured under a condition of five-degree specular reflection at an incident light angle of five-degree via the spectrophotometer U-4000 (manufactured by Hitachi, Ltd.),
(Particle Size of Minute Metal Oxide Particles)
The particle size of the minute metal oxide particles was determined in such a manner that the 100 particles thereof were observed via a scanning electron microscope (SEM), and the diameter of a circle circumscribed on each minute particle was measured, and then the average of the measured diameters was used as the particle size of the minute metal oxide particles.
<<Preparation of Cellulose Ester Film Comprising Hard Coat Layer and Back Coat Layer>>
A hard coat layer coating solution, which was prepared by filtration of the following coating solution for a hard coat layer with a polypropylene filter having a pore size of 0.4 μm, was applied onto a cellulose ester film KC8UX2M (produced by Konica Minolta Opto, Inc.) using a micro gravure coater. After the coated film being dried at 90° C., a hard coat layer having a dry thickness of 10 μm was formed on the cellulose ester film by curing the dried coated layer using a UV lamp with the luminous intensity at the illuminated part being 100 mW/cm$^2$ and the amount of irradiation being 0.1 J/cm$^2$, to prepare a hard coat film.

(Hard Coat Layer Coating Solution)

A hard coat layer coating solution was made by blending, while stirring, the materials below.

| | |
|---|---|
| Acrylic monomer; KAYARAD DPHA (dipentaerythritol hexaacrylate, produced by Nippon Kayaku Co., Ltd.) | 220 parts by mass |
| IRGACURE 184 (produced by Ciba Specialty Chemicals Inc.) | 20 parts by mass |
| Propyleneglycolmonomethylether | 110 parts by mass |
| Ethylacetate | 110 parts by mass |

Further, the following back coat layer composition was applied by an extrusion coater to 10 μm in wet thickness, dried at 85° C., and then wound to provide a back coat layer.

(Back Coat Layer Composition)

| | |
|---|---|
| Acetone | 54 parts by mass |
| Methylethylketone | 24 parts by mass |
| Methanol | 22 parts by mass |
| Diacetylcellulose | 0.6 parts by mass |
| Silica particulates 2% acetone dispersion (Aerosil 200V: produced by Nippon Aerosil Co., Ltd.) | 0.2 parts by mass |

<<Preparation of Antireflection>>

On the hard coat film prepared above, antireflection layers were provided by application of the undermentioned high refractive index layer and low refractive index layer in that order to prepare an antireflection film.

<<Preparation of Antireflection Layer: High Refractive Index Layer>>

On the hard coat film, the following high refractive index layer coating composition was applied by an extrusion coater, and dried at 8D ° C. for 1 minute, followed by curing the layer by irradiation of UV rays of 0.1 J/cm$^2$. Further, the layer was thermally cured at 100° C. for 1 minute to form a high refractive index layer having a thickness of 78 nm.

The refractive index of the high refractive index layer was 1.62.

<High Refractive Index Layer Coating Composition>

| | |
|---|---|
| Isopropyl alcohol solution containing metal oxide particulates (solid content: 20%, ITO particles, particle size: 5 nm) | 55 parts by mass |
| Metal compound: Ti(OBu)$_4$ (titanium tetra-n-butoxide) | 1.3 parts by mass |
| Ionizing radiation curable resin: dipentaerythritol hexaacrylate | 3.2 parts by mass |
| Photopolymerization initiator: Irugacure 184 (produced by Ciba Specialty Chemicals Inc.) | 0.8 parts by mass |
| 10% propyleneglycolmonomethylether liquid of normal-chain dimethyl silicone-EO block copolymer (FZ-2207, Nippon Unicar Co., Ltd.) | 1.5 parts by mass |
| Propyleneglycolmonomethylether | 120 parts by mass |
| Isopropylalcohol | 240 parts by mass |
| Methylethylketone | 40 parts by mass |

<<Preparation of Anti-Reflection Layer: Low Refractive Index Layer>>

On the above-mentioned high refractive index layer, the following low refractive index layer coating composition was applied by an extrusion coater, and dried at 100° C. for 1 minute, followed by curing the layer by irradiation of UV rays of 0.1 J/cm$^2$. The layer was further cured thermally at 120° C. for 5 minutes to form a low refractive index layer having a thickness of 95 nm. Thus, anti-reflection film was prepared. The refractive index of this low refractive index layer was 1.37.

(Preparation of Low Refractive Index Layer Coating Composition)

<Preparation of Hydrolyzed Tetraethoxysilane A>

In a mixture of 289 g of tetraethoxysilane and 553 g of ethanol, 157 g of aqueous 0.15% acetic acid solution was added, and stirred in a 25° C. water bath for 30 hours to prepare hydrolyzed tetraethoxysilane A.

| | |
|---|---|
| Hydrolyzed tetraethoxysilane A | 110 parts by mass |
| Hollow silica particulates (P-2) dispersion | 30 parts by mass |
| KBM503 (silane coupling agent: produced by Shin-Etsu Chemical Co., Ltd.) | 4 parts by mass |
| 10% propyleneglycolmonomethylether liquid of normal-chain dimethyl silicone-EO block copolymer (FZ-2207: Nippon Unicar Co., Ltd.) | 3 parts by mass |
| Propyleneglycolmonomethylether | 400 parts by mass |
| Isopropylalcohol | 400 parts by mass |

<Preparation of Hollow Silica Particle (P-2) Dispersion>

A mixture of 100 g of silica sol having an average particle size of 5 nm and a concentration of SiO$_2$ of 20%, and 1,900 g of distilled water was heated to 80° C. The pH of the reaction mother liquid was 10.5. In the mother liquid, 9,000 g of sodium silicate aqueous solution of 0.98% by weight as SiO$_2$ and 9,000 g of sodium aluminate solution of 1.02% by weight as Al$_2$O$_3$ were simultaneously added while maintaining the temperature of the reaction liquid at 80° C. The pH of the reaction liquid increased to 12.5 immediately after adding the aqueous solutions, and then remained almost constant. After completion of the addition, the reaction liquid was cooled to ambient temperature, and the solid component was washed by using an ultrafilter membrane to prepare a SiO$_2$.Al$_2$O$_3$ core particle dispersion having a solid content of 20% by weight. (Process (a))

To 500 g of the above prepared core particle dispersion, 1,700 g of distilled water was added, and the resulting solution was heated to 98° C. And to the resulting liquid, while maintaining the temperature at 98° C., 3,000 g of a silicate solution (SiO$_2$ content of 3.5% by weight) prepared via dealkalization of an aqueous sodium silicate solution employing a cation exchange resin was added, to prepare a dispersion of core particles constituting the first silica coat layer. (Process (b))

Next, to 500 g of the dispersion of core particles constituting the first silica coat layer, of which solid content became 13% by weight by washing employing a ultrafilter membrane, 1,125 g of distilled water was added, and further a concentrated hydrochloric acid (35.5%) was added dropwise to adjust the pH to 1.0, followed by a dealuminization treatment. Then, dissolved aluminum salt was removed employing an ultrafilter membrane while adding 10 liter of pH 3 hydrochloric acid and 5 liter of distilled water, to prepare a dispersion of porous $SiO_2.Al_2O_3$ core particles from which a part of constituting component constituting the first silica coat layer was removed. (Process (c))

A mixture of 1,500 g of the above-prepared dispersion of porous particles, 500 g of distilled water, 1,750 g of ethanol, and 626 g of 28% aqueous ammonia was heated to 35° C., followed by addition of 104 g of ethyl silicate solution ($SiO_2$: 28% by weight), to form a second silica coat layer by coating the surface of porous particles, on which the first silica coat layer was formed, with hydrolyzed and polycondensed ethyl silicate. Subsequently, a dispersion of hollow silica particles (P-2) having a solid content of 20; by weight was prepared by substituting the solvent with ethanol employing an ultrafilter membrane.

The hollow silica particles had a first silica coat layer of 3 nm in thickness, an average particle size of 47 nm, a $MOx/SiO_2$ ratio (in mole) of 0.0017, and a refractive index of 1.28. The average particle size was determined employing a dynamic light scattering method.

<<Heat Treatment of Antireflection Film>>

The prepared antireflection film was subjected to heat treatment in a heat treatment chamber at 80° C. for 4 days.

<Preparation of Antireflection Polarizing Plate>

A polarizing plate was prepared by the above-described method employing the above-prepared antireflection film as one of polarizing plate protective films, and the polarizing plate protective film, prepared in Example 1, as the other polarizing plate protective film. And then, from a liquid crystal television WOOO W17-LC50 produced by Hitachi, Ltd., which is an In-Plane Switching mode liquid crystal display, the originally adhered polarizing plate on the viewing side thereof was peeled off, and the polarizing plate prepared above was adhered to the glass surface of the liquid crystal cell. At the above adhesion, the polarizing plate protective film prepared in Example 1 was arranged to be adhered onto the liquid crystal cell side.

When a picture image on the above liquid crystal television was viewed, it was found that the television exhibits almost no color variation from any viewing angles, and an excellent antireflection property.

Also an excellent picture image was obtained even in a case that the ethylene modified PVA film described below was employed as a polarizer.

<Polarizer: Preparation of Ethylene Modified PVA Film>

100 parts by mass of ethylene modified PVA having a content of ethylene unit of 2.5 mol %, a degree of saponification of 99.95 mol %, and a degree of polymerization of 2,400 was impregnated with 10 parts by mass of glycerin and 170 parts by mass of water. The resulting mixture was melted, kneaded, defoamed, and then melt-extruded from a T die on a metal roll to form a film. The film was subjected to drying and heat treatment to prepare an ethylene modified PVA film exhibiting a thickness of 40 μm and an average hot-water cutting temperature of 70° C.

The ethylene modified PVA film thus prepared was successively subjected to preliminary swelling, dyeing, uniaxial stretching, fixing, drying and heat treating in this order to form a polarization film. Namely, the above-described ethylene modified PVA film was immersed in 30° C. water for 60 seconds for preliminary swelling, and further immersed in a 35° C. aqueous solution containing 40 g/l of boric acid, 0.4 g/l of iodine, and 60 g/l of potassium iodide for 2 minutes. Subsequently, the resulting film was uniaxially stretched with a stretching magnification of 6 in a 55° C. aqueous solution of 4% of boric acid, and then immersed in a 30° C. aqueous solution containing 60 g/l of potassium iodide, 40 g/l of boric acid, and 10 g/l of zinc chloride, for 5 minutes for fixing. After that, the ethylene modified PVA film was taken out of the aqueous solution, dried with 40° C. hot air, and further heat treated at 100° C. for 5 minutes.

The prepared polarizing film exhibited a light transmittance of 44.34%, a degree of polarization of 99.46%, and a calculated dichroic ratio of 49.13. Further, the prepared polarizing film, when placed at 10 degrees between two polarizing plates, which were arranged parallel relative to the stretching direction (namely 0 degree), resulted in excellent qualities such that the difference of brightness between the central portion and edge portions with respect to the width direction of the polarizing film was stall, and color mottles were also small.

The invention claimed is:

1. A polarizing plate protective film comprising a mixture of a cellulose ester and a polymer X,
    wherein the polymer X has a weight-average molecular weight of 500 to 100,000 and the polymer X is produced by copolymerizing a styrene derivative monomer Xa and an ethylenically unsaturated monomer Xb, provided that Xa has no hydroxyl group in the molecule and Xb has a hydroxyl group or a carboxyl group in the molecule.

2. The polarizing plate protective film of claim 1,
    wherein Xb is at least one compound selected from the group consisting of a hydroxystyrene, a hydroxyacrylate, and a hydroxymethacrylate.

3. A polarizing plate comprising a polarizer sandwiched by two polarizing plate protective films,
    wherein at least one of the polarizing plate protective films is the polarizing plate protective film of claim 1.

4. A liquid crystal display device comprising a liquid crystal cell,
    wherein the polarizing plate of claim 3 is provided on at least one of surfaces of the liquid crystal cell.

5. The liquid crystal display device of claim 4,
    wherein the liquid crystal display device is driven by an in-plane switching mode.

* * * * *